(12) United States Patent
Curtis et al.

(10) Patent No.: US 7,569,147 B2
(45) Date of Patent: Aug. 4, 2009

(54) SCREENING OF INERT SOLIDS FROM A LOW-YIELD WASTEWATER TREATMENT PROCESS

(75) Inventors: Betty-Ann Curtis, Mukwonago, WI (US); Marc Roehl, Mukwonago, WI (US); Michael Doyle, Wauwatosa, WI (US); Peter J. Petit, Pewaukee, WI (US)

(73) Assignee: Siemens Water Technologies Corp., Warrendale, PA (US)

( * ) Notice: Subject to any disclaimer, the term of this patent is extended or adjusted under 35 U.S.C. 154(b) by 415 days.

(21) Appl. No.: 11/469,009

(22) Filed: Aug. 31, 2006

(65) Prior Publication Data
US 2007/0051677 A1 Mar. 8, 2007

Related U.S. Application Data

(60) Provisional application No. 60/713,804, filed on Sep. 2, 2005.

(51) Int. Cl.
*C02F 3/00* (2006.01)
(52) U.S. Cl. .................. 210/607; 210/623; 210/625
(58) Field of Classification Search .......... 210/607, 210/623, 625
See application file for complete search history.

(56) References Cited

U.S. PATENT DOCUMENTS

| | | | |
|---|---|---|---|
| 2,893,957 A | 7/1959 | Genter et al. |
| 3,047,492 A | 7/1962 | Gambrel |
| 3,192,155 A | 6/1965 | Bready et al. |
| 3,259,566 A | 7/1966 | Torpey |
| 3,544,476 A | 12/1970 | Aiba et al. |
| 3,617,540 A | 11/1971 | Bishop et al. |
| 3,756,946 A | 9/1973 | Levin et al. |
| 3,787,316 A | 1/1974 | Brink et al. |
| 3,907,672 A | 9/1975 | Milne |
| 3,964,998 A | 6/1976 | Barnard |
| 4,042,493 A | 8/1977 | Matsch et al. |
| 4,056,465 A | 11/1977 | Spector |
| 4,132,638 A | 1/1979 | Carlsson |
| 4,141,822 A | 2/1979 | Levin et al. |

(Continued)

FOREIGN PATENT DOCUMENTS

DE 4 238 708 5/1994

(Continued)

OTHER PUBLICATIONS

Adams, Michael W. W., and Robert M. Kelly, "Enzymes from Microorganisms in Extreme Environments," *Chemical & Engineering News*, Dec. 18, 1995, pp. 32-42, vol. 73, No. 51, American Chemical Society, Washington, D.C.

(Continued)

*Primary Examiner*—Chester T Barry

(57) ABSTRACT

A method for removing inert solids from low-yield wastewater treatment processes. The method includes combining wastewater with bacteria-laden sludge in a mainstream reactor to form a mixed liquor, separating the mixed liquor into a clear effluent and activated sludge, returning a first portion of activated sludge to the mainstream reactor, treating a second portion of activated sludge in a sidestream bioreactor prior to returning the second portion of activated sludge to the mainstream reactor, and employing a screening device within the wastewater treatment process to remove inert solids.

63 Claims, 13 Drawing Sheets

U.S. PATENT DOCUMENTS

| | | |
|---|---|---|
| 4,160,724 A | 7/1979 | Laughton |
| 4,162,153 A | 7/1979 | Spector |
| 4,173,531 A * | 11/1979 | Matsch et al. ............... 210/624 |
| 4,271,026 A | 6/1981 | Chen et al. |
| 4,277,342 A | 7/1981 | Hayes et al. |
| 4,279,753 A | 7/1981 | Nielson et al. |
| 4,284,510 A | 8/1981 | Savard et al. |
| 4,323,367 A | 4/1982 | Ghosh |
| 4,351,729 A | 9/1982 | Witt |
| 4,370,233 A | 1/1983 | Hayes et al. |
| 4,374,730 A | 2/1983 | Braha et al. |
| 4,407,717 A | 10/1983 | Teletzke et al. |
| 4,491,522 A | 1/1985 | Ishida et al. |
| 4,522,722 A | 6/1985 | Nicholas |
| 4,527,947 A | 7/1985 | Elliot |
| 4,537,682 A | 8/1985 | Wong-Chong |
| 4,568,457 A | 2/1986 | Sullivan |
| 4,568,462 A | 2/1986 | Böhnke et al. |
| 4,599,167 A | 7/1986 | Benjes et al. |
| 4,632,758 A | 12/1986 | Whittle |
| 4,643,830 A | 2/1987 | Reid |
| RE32,429 E | 6/1987 | Spector |
| 4,675,114 A | 6/1987 | Zagyvai et al. |
| 4,705,633 A | 11/1987 | Bogusch |
| 4,731,185 A | 3/1988 | Chen et al. |
| 4,780,198 A | 10/1988 | Crawford et al. |
| 4,790,939 A | 12/1988 | Suzuki et al. |
| 4,797,212 A | 1/1989 | Von Nordenskjöld |
| 4,818,391 A | 4/1989 | Love |
| 4,842,732 A | 6/1989 | Tharp |
| 4,849,108 A | 7/1989 | De Wilde et al. |
| 4,867,883 A | 9/1989 | Daigger et al. |
| 4,874,519 A | 10/1989 | Williamson |
| 4,891,136 A | 1/1990 | Voyt |
| 4,915,840 A * | 4/1990 | Rozich ....................... 210/605 |
| 4,956,094 A | 9/1990 | Levin et al. |
| 4,961,854 A | 10/1990 | Wittmann et al. |
| 4,975,197 A | 12/1990 | Wittmann et al. |
| 4,999,111 A | 3/1991 | Williamson |
| 5,013,442 A | 5/1991 | Davis et al. |
| 5,019,266 A | 5/1991 | Soeder et al. |
| 5,022,993 A * | 6/1991 | Williamson ................. 210/605 |
| 5,051,191 A | 9/1991 | Rasmussen et al. |
| 5,094,752 A | 3/1992 | Davis et al. |
| 5,098,567 A | 3/1992 | Nishiguchi |
| 5,114,587 A | 5/1992 | Hagerstedt |
| 5,126,049 A | 6/1992 | Hallberg |
| 5,128,040 A | 7/1992 | Molof et al. |
| 5,137,636 A | 8/1992 | Bundgaard |
| 5,151,187 A | 9/1992 | Behmann |
| 5,182,021 A | 1/1993 | Spector |
| 5,234,595 A | 8/1993 | DiGregorio et al. |
| 5,246,585 A | 9/1993 | Meiring |
| 5,254,253 A | 10/1993 | Behmann |
| 5,288,405 A | 2/1994 | Lamb, III |
| 5,288,406 A | 2/1994 | Stein |
| 5,304,308 A | 4/1994 | Tsumura et al. |
| 5,316,682 A | 5/1994 | Keyser et al. |
| 5,336,290 A | 8/1994 | Jermstad |
| 5,342,522 A | 8/1994 | Marsman et al. |
| 5,348,653 A | 9/1994 | Rovel |
| 5,348,655 A | 9/1994 | Simas et al. |
| 5,356,537 A | 10/1994 | Thurmond et al. |
| 5,376,242 A | 12/1994 | Hayakawa |
| 5,380,438 A | 1/1995 | Nungesser |
| 5,389,258 A | 2/1995 | Smis et al. |
| 5,480,548 A | 1/1996 | Daigger et al. |
| 5,482,630 A | 1/1996 | Lee et al. |
| 5,505,862 A | 4/1996 | Sonnenrein |
| 5,514,277 A | 5/1996 | Khudenko |
| 5,514,278 A | 5/1996 | Khudenko |
| 5,531,896 A | 7/1996 | Tambo et al. |
| 5,543,051 A | 8/1996 | Harris |
| 5,543,063 A | 8/1996 | Walker et al. |
| 5,582,734 A | 12/1996 | Coleman et al. |
| 5,601,719 A | 2/1997 | Hawkins et al. |
| 5,611,927 A | 3/1997 | Schmid |
| 5,624,562 A | 4/1997 | Scroggins |
| 5,624,565 A | 4/1997 | Lefevre et al. |
| 5,626,755 A * | 5/1997 | Keyser et al. ............... 210/614 |
| 5,650,069 A | 7/1997 | Hong et al. |
| 5,651,891 A | 7/1997 | Molof et al. |
| 5,658,458 A | 8/1997 | Keyser et al. |
| 5,725,772 A | 3/1998 | Shirodkar |
| 5,733,455 A | 3/1998 | Molof et al. |
| 5,733,456 A | 3/1998 | Okey et al. |
| 5,746,919 A | 5/1998 | Dague et al. |
| 5,773,526 A | 6/1998 | Van Dijk et al. |
| 5,811,008 A | 9/1998 | Von Nordenskjold |
| 5,818,412 A | 10/1998 | Maekawa |
| 5,824,222 A | 10/1998 | Keyser et al. |
| 5,833,856 A | 11/1998 | Liu et al. |
| 5,846,424 A | 12/1998 | Khudenko |
| 5,853,588 A | 12/1998 | Molof et al. |
| 5,858,222 A | 1/1999 | Shibata et al. |
| 5,919,367 A | 7/1999 | Khudenko |
| 5,989,428 A | 11/1999 | Goronszy |
| 5,993,503 A | 11/1999 | Kruidhof |
| 6,004,463 A | 12/1999 | Swett |
| 6,015,496 A | 1/2000 | Khudenko |
| 6,036,862 A | 3/2000 | Stover |
| 6,039,874 A | 3/2000 | Teran et al. |
| 6,047,768 A | 4/2000 | Buehler, III |
| 6,054,044 A | 4/2000 | Hoffland et al. |
| 6,066,256 A | 5/2000 | Henry et al. |
| 6,077,430 A | 6/2000 | Chudoba et al. |
| 6,113,788 A | 9/2000 | Molof et al. |
| 6,117,323 A | 9/2000 | Haggerty |
| 6,193,889 B1 | 2/2001 | Teran et al. |
| 6,217,768 B1 | 4/2001 | Hansen et al. |
| 6,352,643 B1 | 3/2002 | Kwon et al. |
| 6,383,387 B2 | 5/2002 | Hasegawa et al. |
| 6,416,668 B1 | 7/2002 | Al-Samadi |
| 6,454,949 B1 | 9/2002 | Sesay et al. |
| 6,527,956 B1 | 3/2003 | Lefevre et al. |
| 6,555,002 B2 | 4/2003 | Garcia et al. |
| 6,562,237 B1 | 5/2003 | Olaopa |
| 6,585,895 B2 | 7/2003 | Smith et al. |
| 6,592,762 B2 | 7/2003 | Smith |
| 6,605,220 B2 | 8/2003 | Garcia et al. |
| 6,613,238 B2 | 9/2003 | Schloss |
| 6,630,067 B2 | 10/2003 | Shieh et al. |
| 6,660,163 B2 | 12/2003 | Miklos |
| 6,706,185 B2 | 3/2004 | Goel et al. |
| 6,712,970 B1 | 3/2004 | Trivedi |
| 6,783,679 B1 | 8/2004 | Rozich |
| 6,787,035 B2 | 9/2004 | Wang |
| 6,805,806 B2 | 10/2004 | Arnaud |
| 6,814,868 B2 * | 11/2004 | Phagoo et al. ............... 210/651 |
| 6,833,074 B2 | 12/2004 | Miklos |
| 6,863,818 B2 | 3/2005 | Daigger et al. |
| 6,884,355 B2 | 4/2005 | Kamiya et al. |
| 6,893,567 B1 | 5/2005 | Vanotti et al. |
| 7,105,091 B2 | 9/2006 | Miklos |
| 7,208,090 B2 | 4/2007 | Applegate et al. |
| 2001/0045390 A1 | 11/2001 | Kim et al. |
| 2004/0016698 A1 | 1/2004 | Unger |
| 2005/0040103 A1 | 2/2005 | Abu-Orf et al. |
| 2005/0045557 A1 | 3/2005 | Daigger et al. |
| 2006/0113243 A1 | 6/2006 | Applegate et al. |

2007/0000836 A1    1/2007  Elefritz et al.

FOREIGN PATENT DOCUMENTS

| | | |
|---|---|---|
| DE | 4444335 | 6/1996 |
| EP | 0 106 043 | 4/1984 |
| EP | 0 408 878 | 1/1991 |
| EP | 0 440 996 | 8/1991 |
| EP | 1 236 686 | 9/2002 |
| GB | 2 006 743 | 5/1979 |
| JP | 59032999 | 2/1984 |
| JP | 59052597 | 3/1984 |
| JP | 60-84199 | 5/1985 |
| JP | 61192389 | 8/1986 |
| JP | 63130197 | 6/1988 |
| JP | 62138986 | 12/1988 |
| JP | 63302996 | 12/1988 |
| JP | 01174949 | 2/1991 |
| JP | 3042019 | 2/1991 |
| JP | 6091285 | 4/1994 |
| JP | P2000-199086 | 7/2000 |
| JP | 2000210542 | 8/2000 |
| NL | 9301791 | 10/1993 |
| RU | 1 596 752 | 9/1995 |
| WO | WO 93/15026 | 8/1993 |
| WO | WO 94/24055 | 10/1994 |
| WO | WO 03/072512 | 9/2003 |

OTHER PUBLICATIONS

Casey, T. G., et al., "A Hypothesis for the Causes and Control of Anoxic-Aerobic (AA) Filament Bulking in Nutrient Removal Activated Sludge Systems," *Water Science and Technology*, 1994, pp. 203-212, vol. 29, No. 7, IAWQ/Pergamon.

Cecchi, F., et al., "Anaerobic Digestion of Municipal Solid Waste," *BioCycle*, Jun. 1990, pp. 42-43, vol. 31, No. 6, The JG Press, Inc.

Chen, G-H., et al., "Minimization of activated sludge production by chemically stimulated energy spilling," *Water Science and Technology*, 2000, pp. 189-200, vol. 42, No. 12, IWA Publishing.

Chen, Guang-Hao, et al., "Effect of Sludge Fasting/Feasting on Growth of Activated Sludge Cultures," *Wat. Res.*, 2001, pp. 1029-1037, vol. 35, No. 4, Elsevier Science Ltd./Pergamon.

Chudoba, P., et al., "The Aspect of Energetic Uncoupling of Microbial Growth in the Activated Sludge Process—OSA System," *Water Science and Technology*, 1992, pp. 2477-2480, vol. 26, No. 9-11, IAWPRC.

Ekama, G. A., et al., "Considerations in the Process Design of Nutrient Removal Activated Sludge Processes," *Water Science and Technology*, 1983, pp. 283-318, vol. 15, IAWPRC/Pergamon Press Ltd.

Fukase, T., et al., "Factors Affecting Biological Removal of Phosphorus," *Water Science and Technology*, 1985, pp. 187-198, vol. 17, Nos. 11/12, IAWPRC, London.

Harrison, D. E. F., and J. E. Loveless, "Transient Responses of Facultatively Anaerobic Bacteria Growing in Chemostat Culture to a Change from Anaerobic to Aerobic Conditions," *Journal of General Microbiology*, 1971, pp. 45-52, vol. 68.

Heinzmann, Bernd, and Gerd Engel, "Phosphorus Recycling in Treatment Plants with Biological Phosphorus Removal," paper presented at the German Federal Environment Ministry, Feb. 6-7, 2003, pp. 1-16, Berlin, Germany.

Hong, S., et al., "Biological Phosphorus and Nitrogen Removal Via the A/O Process: Recent Experience in the United States and United Kingdom," *Water Science and Technology*, 1984, pp. 151-172, vol. 16, Vienna, Austria.

Low, Euan W., and Howard A. Chase, "The Use of Chemical Uncouplers for Reducing Biomass Production During Biodegradation," *Water Science and Technology*, 1998, pp. 399-402, vol. 37, No. 4-5, Elsevier Science Ltd./Pergamon.

Marais, G. v. R., et al., "Observations Supporting Phosphate Removal by Biological Excess Uptake—A Review," *Water Science and Technology*, 1983, pp. 15-41, vol. 15, IAWPRC/Pergamon Press. Ltd.

Matsuo, Tomonori, et al., "Metabolism of Organic Substances in Anaerobic Phase of Biological Phosphate Uptake Process," *Water Science and Technology*, 1992, pp. 83-92, vol. 25, No. 6, IAWPRC/Pergamon Press Ltd, Oxford.

Metcalf & Eddy, Table 8-25, "Description of suspended growth processes for phosphorus removal," *Wastewater Engineering Treatment and Reuse*, $4^{th}$ ed., 2003, pp. 810-813, McGraw Hill.

Nielsen, Per Halkjær, "The Significance of Microbial FE (III) Reduction in the Activated Sludge Process," *Water Science and Technology*, 1996, pp. 129-136, vol. 34, Nos. 5-6, Elsevier Science Ltd./Pergamon.

Rader, "Microrganisms and Their Role in the Activated-Sludge Process," Web page accessed Jan. 11, 2005, http://www.college.ucla.edu/webproject/micro7/studentprojects7/Rader/asludge2.htm , pp. 1-19.

Strand, Stuart E., et al., "Activated-Sludge Yield Reduction Using Chemical Uncouplers," *Water Environment Research*, 1999, pp. 454-458, vol. 71, No. 4.

Valentis, G., and J. Lesavre, "Wastewater Treatment by Attached-Growth Micro-Organisms on a Geotextile Support," *Water Science and Technology*, 1990, pp. 43-51, vol. 22, Nos. 1/2, IAWPRC.

Van Loosdrecht, Mark C. M., and Mogens Henze, "Maintenance, Endogeneous Respiration, Lysis, Decay and Predation," *Water Science and Technology*, 1999, pp. 107-117, vol. 39, No. 1, IAWQ/Elsevier Science Ltd./Pergamon.

Wentzel, M. C., et al., "Processes and Modelling of Nitrification Denitrification Biological Excess Phosphorus Removal Systems—A Review," *Water Science and Technology*, 1992, pp. 59-82, vol. 25, No. 6, IAWPRC/Pergamon Press Ltd., Oxford.

Westgarth, W. C., et al., "Anaerobiosis in the Activated-Sludge Process," (paper presentation and formal discussions) Department of Environmental Sciences and Engineering, School of Public Health, University of North Carolina, Chapel Hill, pp. 43-61 (neither publication information nor year provided).

Worthen, Peter T., "The Chesapeake Bay Plan: Restoring An Estuary In Distress," *Water Engineering & Management*, Sep. 1994, pp. 18-22, vol. 141, No. 9, ABI/INFORM Global.

Yasui, H., and M. Shibata, "An Innovative Approach to Reduce Excess Sludge Production in the Activated Sludge Process," *Water Science and Technology*, 1995, pp. 11-20, vol. 30, No. 9, IAWQ/Pergamon.

Yasui, H., et al., "A Full-Scale Operation of a Novel Activated Sludge Process Without Excess Sludge Production," *Water Science and Technology*, 1996, pp. 395-404, vol. 34, No. 3-4, Elsevier Science Ltd./Pergamon.

"Contrashear filter solutions for waste water," for Contra Shear™, Jul. 29, 2005, p. 1 of 1, http://www.contrashear.co.nz/.

"Efficient treatment of high strength industrial and municipal wastewater" brochure by Envirex Inc., Jan. 1990.

"GAC Fluid Bed Efficient, economical bioremediation of BTEX groundwater" brochure by Envirex Inc., Dec. 1992.

"Internally-fed Rotary Wedgewire Screens" brochure by Parkson Corporation for Hycor® Rotoshear® (year not provided).

"Rex VLR/SCC System" brochure by Envirex Inc., Bulletin No. 315-156, Oct. 1989.

"The Rotoscreen™ Escalating Fine Channel Screen Builds Pre-Coat to Provide High Solids Capture Rates with the Lowest Headloss," Jul. 29, 2005, p. 1 of 2-page screen, Parkson Corporation Web Home Page, http://www.parkson.com/Content.aspx?ntopicid=120&parent=process&processID=148.

"The Roloshear® Internally Fed Rotating Drum Screen's Wedgewire Construction Maximizes Capture for Efficient Screening with Minimal Operator Attention," Jul. 29, 2005, p. 1 of 2-page screen, Parkson Corporation Web Home Page, http://www.parkson.com/Content.aspx?ntopicid=133&parent=municipal&processID=149....

"Vertical loop reactors—fine bubble power efficiency without fine bubble maintenance" brochure by Envirex Inc., Jan. 1986.

Chen et al., Effect of Sludge Fasting/Feasting on Growth of Activated Sludge Cultures, *Water. Res.*, vol. 35, No. 4, 2001, pp. 1029-1037.

Charpentier, et al., "ORP Regulation and Activated Sludge 15 years of Experience," 19th Biennial Conference/AWQ of Vancouver—Jun. 1998.

Klopping, et al., "Activated Sludge Microbiology, Filamentous and Non-Filamentous Microbiological Problems and Biological Nutrient Removal," Water Environment Federation, Plant Operations Specialty Conference, Date Unknown.

Caulet, et al., "Modulated Aeration Management by Combined ORP and DO Control: A Guarantee of Quality and Power Savings for Carbon and Nitrogen Removal in Full Scale Wastewater Treatment Plants," Center of International Research for Water Environment, France, 1999.

Chudoba, et al., "Pre-Denitrification Performance of a High-Loaded Anoxic Sludge," Degremont Research Center, France, 1999.

Ra, et al., "Biological Nutrient Removal with an Internal Organic Carbon Source in Piggery Wastewater Treatment," *Water Research*, vol. 34, No. 3, pp. 965-973, 2000.

Kim, et al., "pH and Oxidation-Reduction Potential Control Strategy for Optimization of Nitrogen Removal in an Alternating Aerobic-Anoxic System," *Water Environment Research*, vol. 73, No. 1, 2001.

Abu-Orf, M. M., et al., "Chemical and Physical Pretreatment of ATAD Biosolids for Dewatering," *Water Science Technology*, 2001, vol. 44, No. 10, pp. 309-314, IWA Publishing.

Bakker, E. P., Chapter IIA, "Cell $K^+$ and $K^+$ Transport Systems in Prokaryotes," *In Alkali Cation Transport Systems in Prokaryotes*, Bakker, E.P., Ed., 1993, pp. 205-224, CRC Press.

Bishop, P. L., et al., "Fate of Nutrients during Aerobic Digestion," *Journal Environ. Eng. Div., Proc. Am. Soc. Civil Eng.*, 1978, vol. 104 No. EE5, pp. 967-979.

Bruus, J. H., et al., "On the Stability of Activated Sludge Flocs with Implications to Dewatering," *Water Research*, 1992, vol. 26, No. 12 pp. 1597-1604, Pergamon Press Ltd.

Dignac, M.-F., et al., "Chemical Description of Extracellular Polymers: Implication on Activated Sludge Floc Structure," *Water Science Technology*, 1998, vol. 38, No. 8-9, pp. 45-53, Elsevier Science Ltd.

Dubois, M., et al., "Colorimetric Method for Determination of Sugars and Related Substances," *Analytical Chemistry*, 1956, vol. 28, No. 3, pp. 350-356.

Frølund, B., et al., "Extraction of Extracellular Polymers from Activated Sludge Using a Cation Exchange Resin," *Water Research*, 1996, vol. 30, No. 8, pp. 1749-1758, Elsevier Science Ltd.

Hartree, E.F., "Determination of Protein: A Modification of the Lowry Method that Gives a Linear Photometric Response," *Analytical Biochemistry*, 1972, vol. 48, pp. 422-427, Academic Press, Inc.

Higgins, M. J., et al., "Characterization of Exocellular Protein and Its Role in Bioflocculation," *Journal of Environmental Engineering*, 1997, vol. 123, pp. 479-485.

Higgins, M. J., et al., "The Effect of Cations on the Settling and Dewatering of Activated Sludges: Laboratory Results," *Water Environment Research*, 1997, vol. 69, No. 2, pp. 215-224.

Kakii, K., et al., "Effect of Calcium Ion on Sludge Characteristics," *J. Ferment. Technol.*, 1985, vol. 63, No. 3, pp. 263-270.

Lowry, O. H., et al., "Protein Measurement with the Folin Phenol Reagent," *J. Bio. Chem.*, 1951, vol. 193, pp. 265-275.

Mahmoud, N., et al., "Anaerobic Stabilisation and Conversion of Biopolymers in Primary Sludge—Effect of Temperature and Sludge Retention Time," *Water Research*, 2004, vol. 38, pp. 983-991, Elsevier Ltd.

Mavinic, D. S., et al., "Fate of Nitrogen in Aerobic Sludge Digestion," *J. Water Pollut. Control Fed.*, 1982, vol. 54, No. 4, pp. 352-360.

Moen, G., et al., "Effect of Solids Retention Time on the Performance of Thermophilic and Mesophilic Digestion of Combined Municipal Wastewater Sludges," *Water Environment Research*, 2003, vol. 75, No. 6, pp. 539-548.

Murthy, S. N., et al., "Factors Affecting Floc Properties During Aerobic Digestion: Implications for Dewatering," *Water Environment Research*, 1999, vol. 71, No. 2, pp. 197-202.

Murthy, S. N., et al., "Optimizing Dewatering of Biosolids from Autothermal Thermophilic Aerobic Digesters (ATAD) Using Inorganic Conditioners," *Water Environment Research*, 2000, vol. 72, No. 6, pp. 714-721.

Nielsen, P. H., et al., "Changes in the Composition of Extracellular Polymeric Substances in Activated Sludge During Anaerobic Storage," *Appl. Microbiol. Biotechnol.*, 1996, vol. 44, pp. 823-830, Springer-Verlag.

Novak, J. T., et al., "Mechanisms of Floc Destruction During Anaerobic and Aerobic Digestion and the Effect on Conditioning and Dewatering of Biosolids," *Water Research*, 2003, vol. 37, pp. 3136-3144, Elsevier Science Ltd.

Park, C., et al., "The Digestibility of Waste Activated Sludges," *Water Environment Research*, 2006, vol. 78, No. 1, pp. 59-68.

Rasmussen, H., et al., "Iron Reduction in Activated Sludge Measured with Different Extraction Techniques," *Water Research*, 1996, vol. 30, No. 3, pp. 551-558, Elsevier Science Ltd.

Urbain, V., et al., "Bioflocculation in Activated Sludge: An Analytic Approach," *Water Research*, 1993, vol. 27, No. 5, pp. 829-838, Pergamon Press Ltd.

U.S. Environmental Protection Agency, "Acid Digestion of Sediments, Sludges, and Soils," U.S. EPA Method 3050B, 1996, pp. 1-12.

Holbrook, R. D., et al., "A Comparison of Membrane Bioreactor and Conventional-Activated-Sludge Mixed Liquor and Biosolids Characteristics," *Water Environment Research*, 2005, vol. 77, No. 4, pp. 323-330.

Park, C., et al., "The Effect of Wastewater Cations on Activated Sludge Characteristics: Effects of Aluminum and Iron in Floc," *Water Environment Research*, 2006, vol. 78, No. 1, pp. 31-40.

Abu-Orf, M., et al. "Adjusting Floc Cations to Improve Effluent Quality: The Case of Aluminum Addition at Sioux City Wastewater Treatment Facility," *Water Environment Federation*, 2004, 16 pgs.

* cited by examiner

SCREENING OF INERT SOLIDS FROM A LOW-YIELD WASTEWATER TREATMENT PROCESS

CROSS-REFERENCE TO RELATED APPLICATIONS

This application claims priority under 35 U.S.C. §119(e) to U.S. Provisional Patent Application No. 60/713,804 filed Sep. 2, 2005, the entire content of which is hereby incorporated by reference.

FIELD OF THE INVENTION

The present invention relates to an activated sludge wastewater treatment process. More particularly, the invention relates to the removal of inert solids from a low-yield wastewater treatment process.

BACKGROUND

Wastewater pollutants are typically classified as either organic pollutants or inorganic pollutants. Organic pollutants generally refer to those substances that contain carbon and can be burned. Organic pollutants are often removed by biological wastewater treatment, that is, by cultivating bacteria to convert most of the organic pollutants in the wastewater to carbon dioxide, water, and biomass. Any biomass produced in the process is then separated from the treated wastewater and disposed of by various means, such as landfilling, incineration or application to topsoil as fertilizer. There also exists a class of organic pollutants which are refractory, that is, slow or difficult to biodegrade. Some well-known examples include plastics and hair.

Inorganic pollutants are generally not biologically degradable. Inorganic pollutants are often referred to as minerals. Some well-known examples include clays, grit and sand. In a conventional wastewater treatment plant, inorganic pollutants must be removed from the plant, or they will accumulate in the processing tanks, diminishing the actual volume within the tanks available for biological treatment. For the purposes of this disclosure, inorganic pollutants and refractory organic pollutants will be referred to as "inert solids." Biologically degradable organic pollutants will be referred to as "readily degradable solids."

A conventional activated sludge wastewater treatment process is shown in FIG. 1. The process generally involves cultivating within an aeration reactor a "mixed liquor" of bacterial cells suspended in wastewater. The bacterial cells are only slightly denser than water, and so are easily maintained in suspension. Solid-liquid separators, such as large quiescent clarifiers or membrane-based systems, are typically used to separate the cultivated mixed liquor into bacterial cell mass, referred to as activated sludge, and a clear effluent. The clear effluent may be removed from the waste stream and discharged into a local waterway. At least a portion of the activated sludge may be recycled to the aeration reactor as return activated sludge (RAS). The RAS helps maintain a sufficient concentration of bacterial cells in the aeration reactor for effective cleaning of the incoming wastewater. Since conversion of the readily degradable solids creates additional bacterial cell mass within the wastewater treatment system, a portion of the activated sludge is typically removed from the plant as waste activated sludge (WAS) to maintain the bacterial cell mass within an acceptable performance range.

In general, the proportion of inert solids to readily degradable solids in WAS is similar to that in the mixed liquor in the aeration reactor. In a traditional activated sludge plant, the WAS flow rate is high enough that the concentration of inert solids accumulated within the wastewater treatment plant is relatively low. However, newer processes have been designed that minimize the production of biosludge. These low-yield (low-biosludge-production) wastewater treatment processes significantly reduce WAS, limiting the rate at which inert solids are removed from a plant. Since WAS has typically been the only pathway by which inert solids are removed from a wastewater treatment plant, it follows that inert solids will accumulate within a low-yield wastewater treatment plant unless the inert solids are removed by some other means.

SUMMARY

In one embodiment, the invention provides a wastewater treatment method comprising combining wastewater comprising readily degradable solids and inert solids with bacteria-laden sludge in a mainstream reactor to form a mixed liquor, separating the mixed liquor into a clarified effluent and an activated sludge, passing a first portion of activated sludge through a screening device to remove at least a portion of the inert solids and returning the screened first portion of activated sludge to the mainstream reactor, and treating a second portion of activated sludge in a sidestream bioreactor prior to returning the second portion of activated sludge to the mainstream reactor.

In another embodiment the invention provides a wastewater treatment method comprising combining wastewater comprising readily degradable solids and inert solids with bacteria-laden sludge in a mainstream reactor to form a mixed liquor, separating the mixed liquor into a clarified effluent and an activated sludge, returning a first portion of activated sludge to the mainstream reactor through one of a screening device that removes at least a portion of the inert solids from the activated sludge, a screen bypass line that discharges activated sludge directly into the mainstream reactor, or a combination of both, and treating a second portion of activated sludge in a sidestream bioreactor prior to returning the second portion of activated sludge to the mainstream reactor.

In a further embodiment, the invention provides a wastewater treatment method comprising combining wastewater comprising readily degradable solids and inert solids with bacteria-laden sludge in a mainstream reactor to form a mixed liquor, separating the mixed liquor into a clarified effluent and an activated sludge, passing a first portion of activated sludge through a rotary drum to remove at least a portion of the inert solids and returning the screened first portion of activated sludge to the mainstream reactor, and treating a second portion of activated sludge in a sidestream bioreactor prior to returning the second portion of activated sludge to the mainstream reactor.

In yet a further embodiment, the invention provides a wastewater treatment method comprising combining wastewater comprising readily degradable solids and inert solids with bacteria laden sludge in a mainstream reactor to form a mixed liquor, passing at least a portion of the mixed liquor through a screening device to remove at least a portion of the inert solids, separating the screened mixed liquor into a clarified effluent and an activated sludge, recycling a first portion of activated sludge to the mainstream reactor, and treating a second portion of activated sludge in a sidestream bioreactor prior to returning the second portion of activated sludge to the mainstream reactor.

In still another embodiment, the invention provides a wastewater treatment method comprising combining wastewater comprising readily degradable solids and inert solids with bacteria-laden sludge in a mainstream reactor to form a mixed liquor, separating the mixed liquor into a clarified effluent and an activated sludge, and passing at least a portion of activated sludge through a screening device having screen openings from about 10 µm to about 2,500 µm to remove at least a portion of the inert solids and returning the screened portion of activated sludge to the mainstream reactor, wherein the wastewater treatment method is a low-yield process.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the term "mounted" and variations thereof are used broadly and encompass both direct and indirect mountings. The word "conduit" is used broadly to represent a pathway, and is not meant to be restricted to any particular physical or mechanical device.

The invention discloses low-yield wastewater treatment processes comprising a sidestream bioreactor and a means for removing inert solids. The invention is particularly suited to wastewater treatment plants having a significant influx of inert solids.

Figure 1:
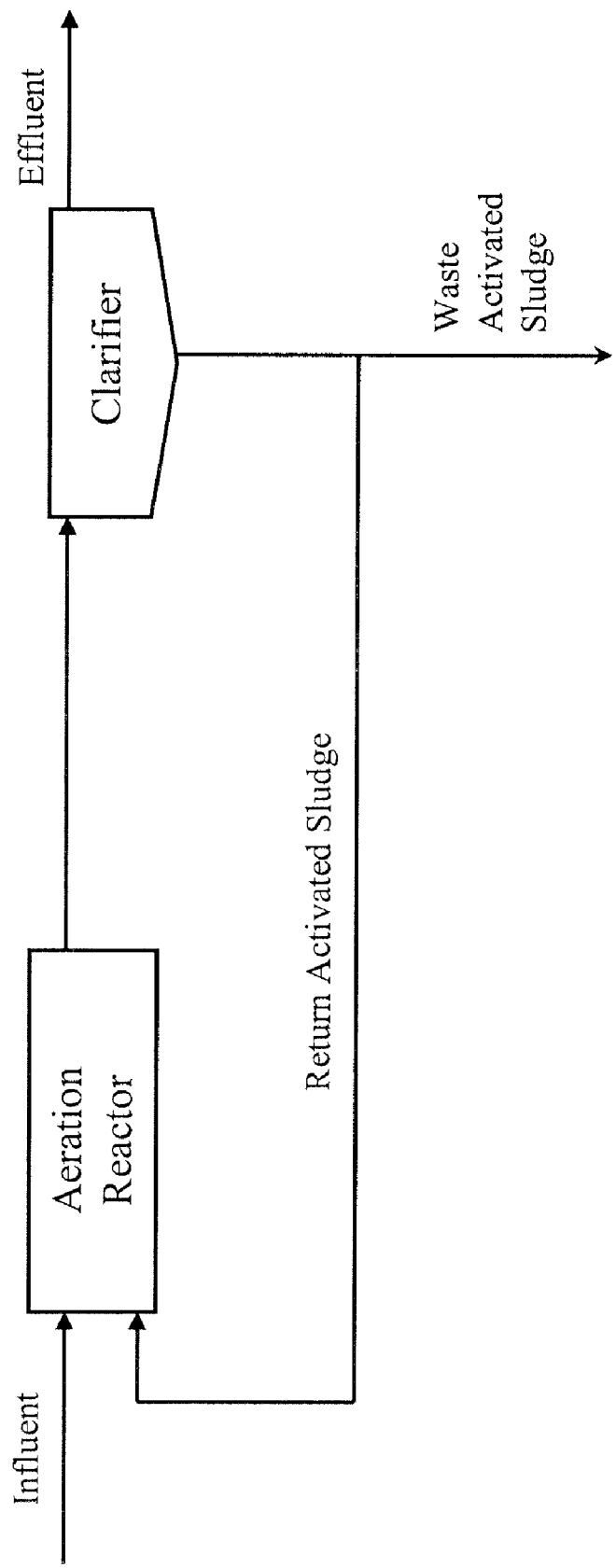
FIG. 1 is a schematic view of a traditional activated sludge wastewater treatment system.
Figure 2:
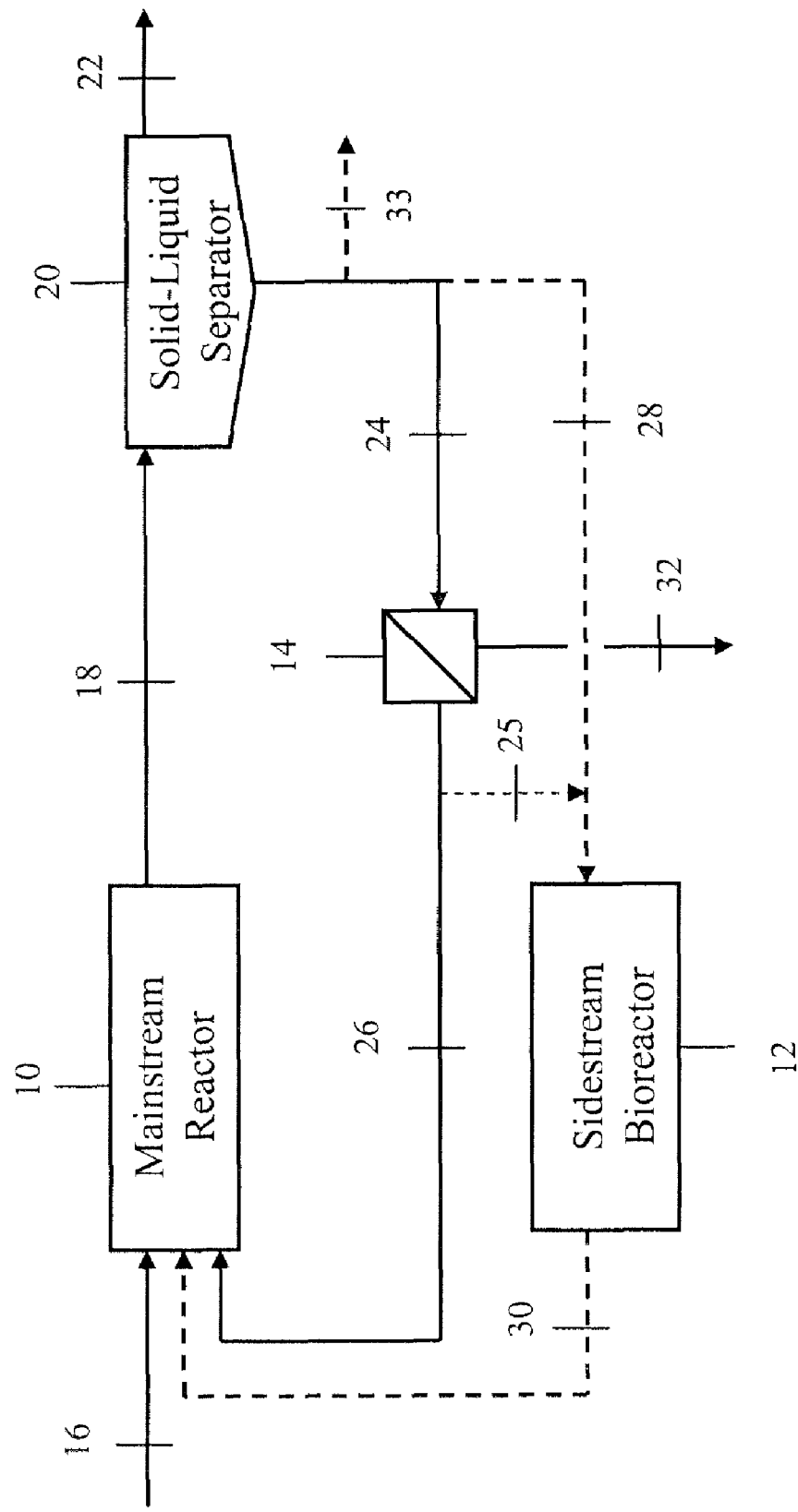
FIG. 2 is a schematic view of a first embodiment of an improved wastewater treatment system.

FIG. 2 illustrates a schematic view of an improved wastewater treatment system embodying the invention. The invention employs a mainstream reactor 10 in combination with a sidestream bioreactor 12 to minimize the WAS generated by the treatment process. A screening device 14 removes inert solids from the system.

As shown in FIG. 2, wastewater comprising organic and inorganic pollutants is transported by conduit 16 to the mainstream reactor 10 where it is mixed with a bacterial-laden sludge, or activated sludge, to form a mixed liquor. The mainstream reactor 10 subjects the mixed liquor to one or more biological growth conditions that cultivate microorganisms to convert readily degradable solids into carbon dioxide, water and bacterial cell mass. The mainstream reactor 10 typically comprises one or more reactor zones, each of which operates under aerobic, anoxic or anaerobic conditions. Within an aerobic zone, the mixed liquor contains sufficient dissolved $O_2$ to cultivate microorganisms that undergo aerobic metabolic processes. Within an anoxic zone, the mixed liquor typically contains no measurable dissolved $O_2$ but does contain oxygen in the form of nitrates and/or nitrites. An anoxic zone will cultivate those organisms that can utilize the oxygen tied up within the nitrates and/or nitrites to carry out their metabolic processes. An anaerobic zone contains no measurable oxygen and will cultivate those organisms that do not require oxygen to carry out their metabolic processes. Although the invention should in no way be limited by scientific theory, it is believed that aerobic zone microorganisms typically oxidize readily degradable solids and simultaneously absorb and store phosphates. Anoxic zone microorganisms typically use nitrate, and optionally oxygen (aerated anoxic), to oxidize readily degradable solids. The anaerobic zone microorganisms typically convert carbon compounds using energy derived from hydrolysis.

The biological populations within the mainstream reactor 10 can be adjusted to accommodate seasonal variations in wastewater and/or treat specific pollutants by varying the number and sequence of reactor zones. The mainstream reactor 10 can be divided into a finite number of discrete zones defined by distinct boundaries. In one embodiment, the mainstream reactor 10 includes three reactor zones, where the mixed liquor is first subjected to an aerobic zone, then subjected to an anoxic zone, and finally subjected to an aerobic zone. In another embodiment, the mainstream reactor 10 includes two reactor zones, where the mixed liquor is first subjected to an aerobic zone followed by an anaerobic zone. In a further embodiment, the mainstream reactor 10 includes four reactor zones, where the mixed liquor is first subjected to an anaerobic zone, followed by an anoxic zone and two aerobic zones. The listed embodiments serve only as examples. It should be understood that the mainstream reactor 10 can comprise two or more reactor zones arranged in any sequence. Furthermore, the mainstream reactor 10 can run as a batch process or a continuous process.

The mainstream reactor 10 can also have a long plug flow design where there are no discrete boundaries and the conditions change gradually over the length of the tank. In one embodiment, the tank environment gradually transitions from an aerobic environment in the upstream end to an anoxic environment in the downstream end. In an alternative embodiment, the tank environment gradually transitions from an anaerobic environment in the upstream end, to an anoxic environment in the middle, and to an aerobic environment in the downstream end.

From the mainstream reactor 10, the mixed liquor is transferred by conduit 18 to a solid-liquid separator 20 where solids are separated from the mixed liquor, leaving behind an activated sludge and a clarified effluent. In the embodiment shown in FIG. 2, the mainstream reactor 10 and solid-liquid separator 20 are separate units. In an alternative embodiment, the mainstream reactor 10 and solid-liquid separator 20 can be combined into a sequencing batch reactor.

The solid-liquid separator 20 is any device that separates solids from liquids by, for example, gravity, differential settling velocity, or size-exclusion. Examples of solid-liquid separators include settling ponds, clarifiers, hydrocyclones, centrifuges, and membrane filters or separators. The clear effluent is removed by conduit 22 and can be disinfected and then discharged into a local waterway. The remaining activated sludge comprises live bacteria, expired bacteria, and inert solids.

A portion of the activated sludge from the solid-liquid separator 20 is recycled to the mainstream reactor 10 by conduits 24 and 26. The recycled sludge, also known as return activated sludge (RAS), maintains a sufficient concentration of bacterial cells in the mainstream reactor 10 to effectively treat the incoming wastewater. A portion of the activated sludge may also be transferred directly by conduit 28, and/or indirectly by conduits 24, 25 and 28, to the sidestream bioreactor 12 where a second bacteria population is cultivated under one or more growth conditions to facilitate the decomposition of readily degradable solids in the wastewater treatment process. A suitable sidestream bioreactor 12 is described below and in U.S. Pat. No. 6,660,163 issued to Miklos, which is hereby fully incorporated by reference.

The bacteria population within the activated sludge typically comprises one or more classes of bacteria. Such classes of bacteria include, but are not limited to, obligate aerobes, facultative aerobes, nitrifiers, obligate anaerobes, and facultative anaerobes. Each bacteria performs a certain function. For example, some bacteria convert particulate biochemical oxygen demand (BOD) into soluble BOD for utilization, some reduce high solids yield organisms, and some improve nitrification/denitrification efficiency. Each bacteria also thrives within a particular range of conditions. Aerobic bacteria thrive in an oxygen-rich environment, anaerobic bacteria thrive in an oxygen-depleted environment, and facultative bacteria can thrive in both environments. Bacteria within a population may be selectively activated by changing the growth conditions to which the population is subjected. Desired growth conditions may be achieved by effecting a selected order of aerobic, anoxic, and anaerobic conditions for varied lengths of time and repetitively controlling those conditions by measurement and reproduction of the oxidation-reduction potential (ORP), specific oxygen uptake rate (SOUR), and/or specific nitrogen uptake rate (SNUR). Therefore, within the sidestream bioreactor 12 it is possible to treat more than one component in the wastewater by selectively varying the conditions of the sidestream bioreactor 12 to sequentially activate the individual types of bacteria.

In one embodiment, the sidestream bioreactor 12 is run under anaerobic conditions to promote the growth and activity of anaerobic bacteria. Such bacteria can include obligate anaerobes and/or facultative anaerobes. Under anaerobic conditions, the bacteria that accumulated quantities of phosphorus in excess of that required for simple cell growth and reproduction during aeration, now take up and store simple carbon compounds, using energy derived from the hydrolysis and release of phosphates. When the activated sludge is eventually returned to the mainstream reactor 10, these bacteria are able to metabolize the absorbed carbon compounds in an aerobic zone.

In a second embodiment, the sidestream bioreactor 12 is a sequencing facultative digester (SFD) favoring a low solids yield. Within an SFD, the activated sludge comprising facultative bacteria is subjected to a sequence of anaerobic and anoxic conditions that contribute to breaking down the readily degradable solids in the wastewater treatment process. The SFD can operate as a batch process, where the entire contents of the SFD are under anoxic conditions or anaerobic conditions at a single moment. Alternatively, the SFD can operate as a continuous process where the SFD is divided into separate compartments, each compartment operating under anoxic or anaerobic conditions. The sequence of conditions may take any order. After processing in the sidestream bioreactor 12, the activated sludge may be recycled to the mainstream reactor 10 as interchange activated sludge (IAS) by conduit 30.

Although each of the activated sludge pathways has been described individually, it should be recognized that the activated sludge may be entirely diverted along one of the pathways or alternatively split along both pathways. Additionally, the selected pathways and the amount of the activated sludge sent to each pathway may be adjusted as needed to most efficiently and effectively treat the wastewater entering the treatment plant at any given time. In one embodiment, about 90% of the activated sludge from the solid-liquid separator 20 is recycled to the mainstream reactor 10 and about 10% of the activated sludge from the solid-liquid separator 20 is passed through the sidestream bioreactor 12. In an additional embodiment, about 80% of the activated sludge from the solid-liquid separator 20 is recycled to the mainstream reactor 10 and about 20% of the activated sludge from the solid-liquid separator 20 is passed through the sidestream bioreactor 12.

Figure 3:
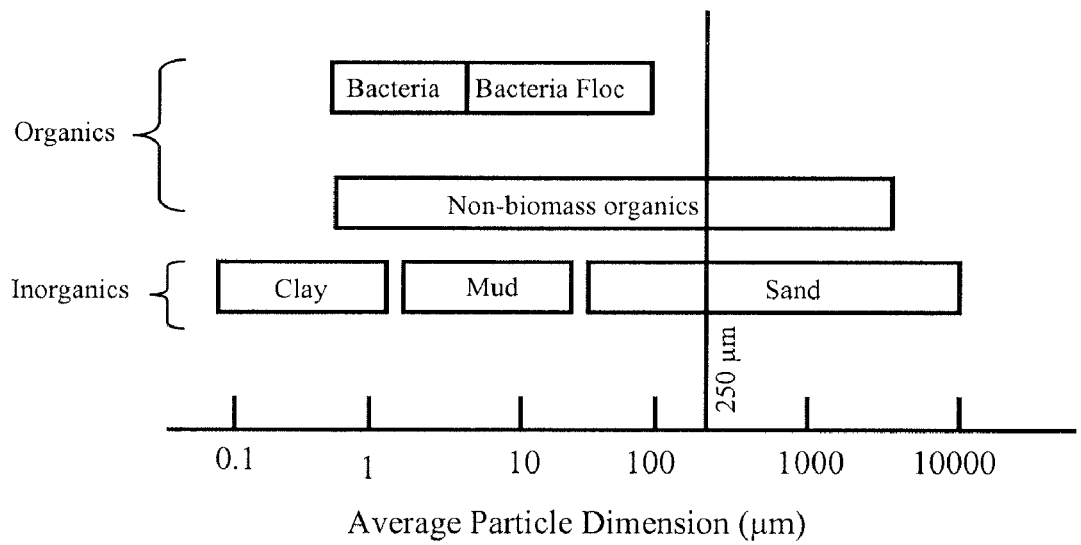
FIG. 3 is a size distribution chart showing the average dimensions for suspended solids typically found in wastewater.
Figure 4:
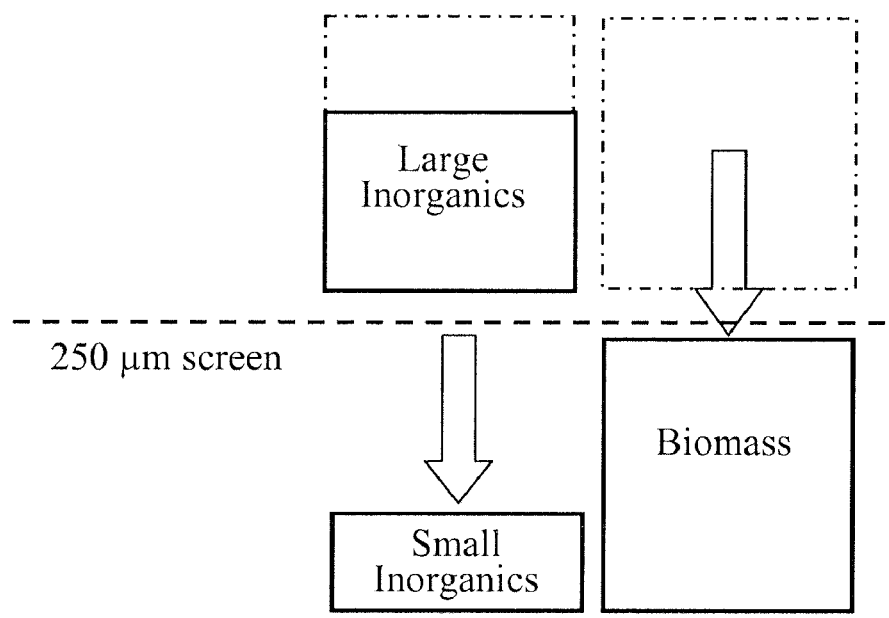
FIG. 4 illustrates the effect of wastewater screening where the screen has an opening size of 250 µm.

The RAS recycled to the mainstream reactor 10 is passed through a screening device 14 to remove inert solids. As shown in FIG. 3, a variety of organic and inorganic pollutants may be present in the wastewater. Readily degradable solids will be decomposed within the treatment plant. However, inert solids will build up in the system and effect plant efficiency if not properly removed. It has been found that screening the activated sludge will remove most inert solids from the plant while allowing the bacterial cell mass to be recycled within the plant. For example, as shown in FIG. 4, a screen having an opening size of 250 $\mu$m may remove large inorganic solids but permit small inorganic solids and bacterial cell mass (biomass) to pass through. As shown in FIG. 2, the inert solids trapped by the screening device 14 are typically removed from the plant by conduit 32 and sent out for proper disposal.

The screening device 14 may comprise any screen or media filter having the capability of filtering inert solids from a wastewater stream while allowing the majority of the bacterial cell mass to pass through. Hereinafter, screens and media filters may be used interchangeably when describing the screening device 14. Screen openings (or interstitial spaces in the case of media filters) are typically at least about 10 $\mu$m, more particularly at least about 150 $\mu$m, and even more particularly at least about 250 $\mu$m. Screen openings are typically smaller than about 6,000 $\mu$m, more particularly smaller than about 2,500 $\mu$m, and even more particularly smaller than about 500 $\mu$m. This includes embodiments having screen openings in the range of about 10 $\mu$m to about 6,000 $\mu$m, further includes embodiments having screen openings in the range of about 10 $\mu$m to about 2,500 $\mu$m, and still further includes embodiments having screen openings in the range of about 250 µm to about 500 µm. In one embodiment, the screening device removes inert solids having average particle diameters greater than 100 µm. In another embodiment, the screening device removes inert solids having average particle diameters greater than about 50 µm.

Although screens are particularly efficient at removing pollutants having average particle diameters greater than the screen openings, it has also been found that screens can capture fine particles which are substantially smaller than the screen openings. The larger particles can form a "mat" or coating which partially blocks the screen openings, effectively reducing their size. Therefore, the screening device 14 may remove a significant number of pollutants having particle dimensions less than the size of the screen openings. In some embodiments, the screening device 14 having a screen opening size of greater than about 100 µm may remove inert solids having average particle diameters smaller than about 100 µm. In other embodiments, the screening device 14 having a screen opening size of greater than about 50 µm may remove inert solids having average particle diameters smaller than about 50 µm.

Suitable screening devices 14 may comprise drum screens. Drum screens may include mesh screening elements. More preferably, the drum screens include wedgewire screening elements. Suitable commercial screening devices include, but are not limited to, BU Milliscreen from Contra Shear™ (Aukland, New Zealand), Rotoscreen™ Escalating Fine Channel Screen from Parkson Corporation (Fort Lauderdale, Fla.), Hycor® Rotoshear® also from Parkson Corporation, Huber Brand Screens (Wiltshire SN14 6NQ, United Kingdom), and a modified Microscreen™ drum screen which may use modular panels of molded plastic mesh from USFilter (Waukesha, Wis.). Other suitable screening devices 14 may include media filters, such as sand filters.

It should be recognized by one skilled in the art that the screening device 14 may comprise a single screen or multiple screens arranged in series or parallel. Multiple screens within a single screening device 14 may have the same size openings, different size openings, or combinations thereof. The screening device 14 may be positioned at various locations throughout the treatment plant. In the embodiment represented by FIG. 2, the screening device 14 filters RAS recycled to the mainstream reactor 10 by conduits 24 and 26. Other non-limiting arrangements are discussed below.

Although the screening device removes a significant portion of inert solids in a wastewater stream, it does not remove 100% of the inert solids. As a result, inert solids may build up in the processing tanks over time. Therefore, conduit 33 provides a means for periodic wasting of the sludge to prevent the build-up of inert solids in the wastewater treatment system. The period between sludge wasting will depend upon a number of factors that include, but are not limited to, the nature of the incoming wastewater, the treatment process and the time of year. For example, a wastewater treatment plant may waste sludge every month, every six months or once a year. Additionally, a wastewater treatment plant may waste all of the sludge or just a portion of the sludge at any given time. Although the location of wasting in FIG. 2 is directly after the solid-liquid separator 20, it should be understood that wasting may occur at any point in the wastewater treatment process.

Figure 5:
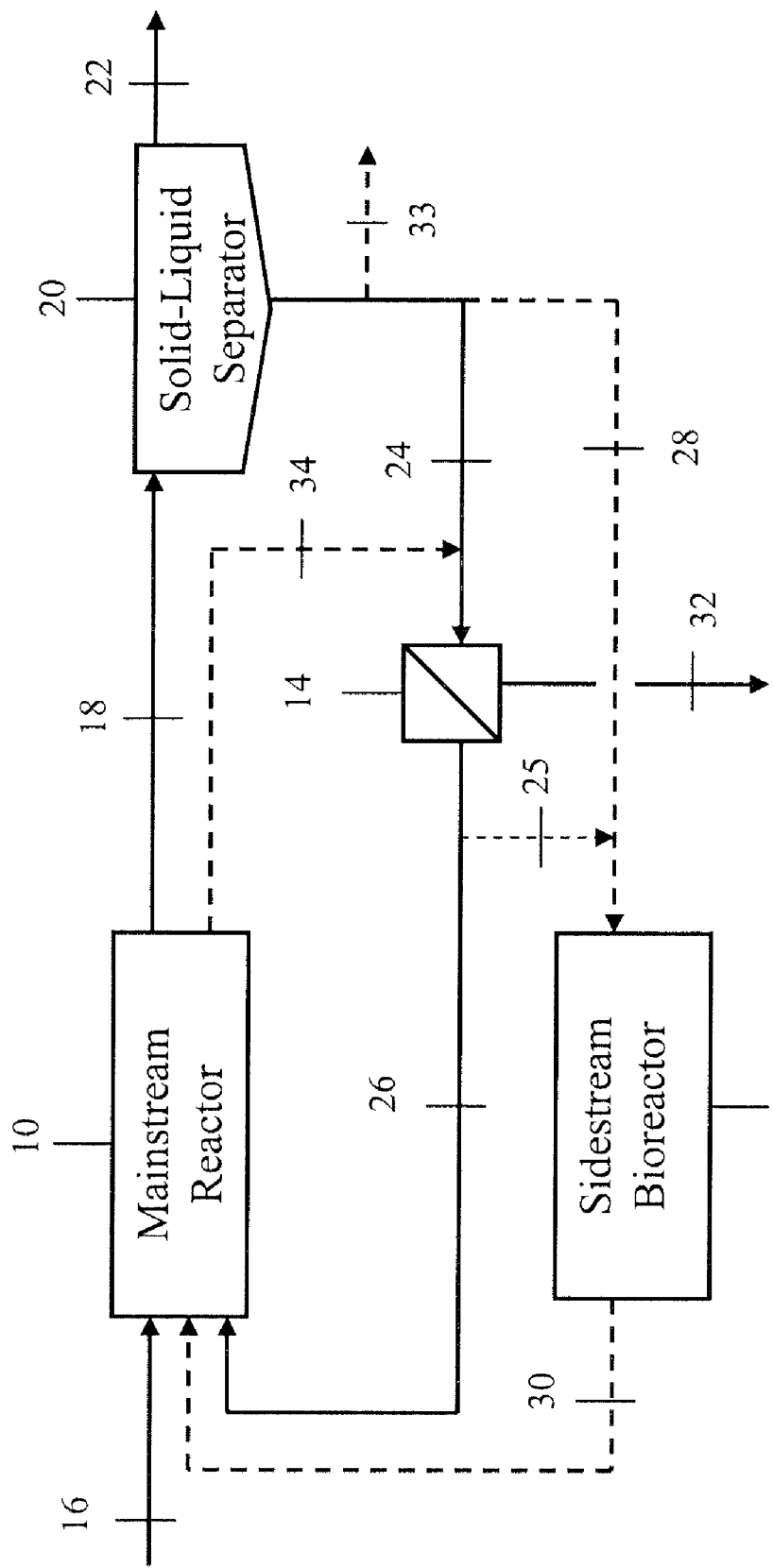
FIG. 5 is a schematic view of a second embodiment of an improved wastewater treatment system.

FIG. 5 represents a variation on the embodiment illustrated in FIG. 2. Under certain conditions, the concentration of solids in the activated sludge may exceed optimal screening conditions. In such cases, it may be beneficial to dilute the activated sludge prior to sending it through the screening device 14. As shown in FIG. 5, a separator bypass line 34 can be used to remove at least a portion of the mixed liquor from the mainstream reactor 10 for the purpose of diluting RAS upstream of the screening device 14. In one exemplary embodiment, mixed liquor having a suspended solids concentration of about 4,000 mg/l to about 6,000 mg/l is diverted through the separator bypass line 34 to dilute the RAS having a solids concentration of about 15,000 mg/l or more.

Figure 6:
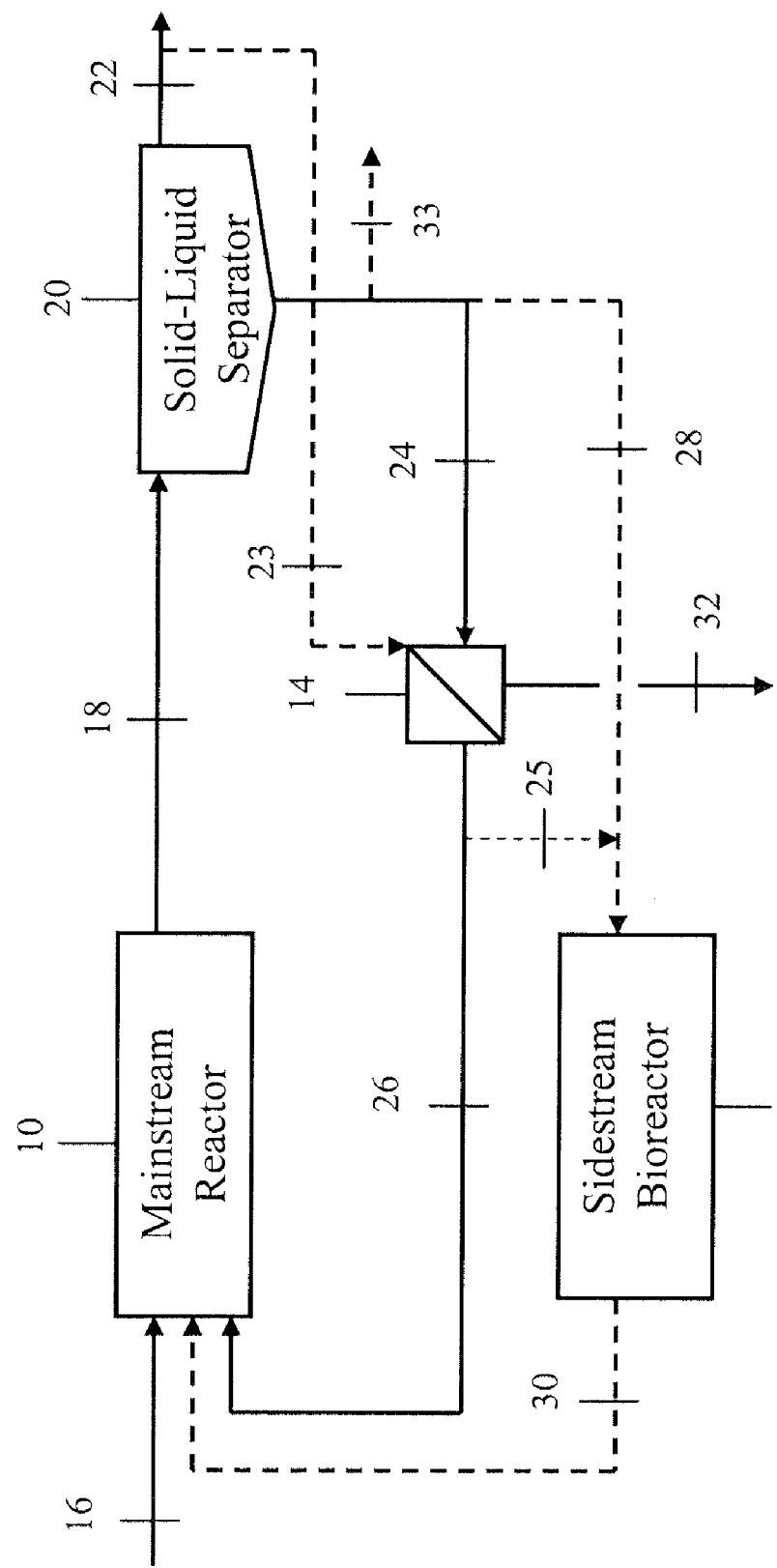
FIG. 6 is a schematic view of a third embodiment of an improved wastewater treatment system.

FIG. 6 represents another variation on the embodiment of FIG. 2 where return process water may be diverted to the screen 14 to help facilitate the passage of biomass through the screen and ultimately enhance separation of inert solids from the activated sludge. In the embodiment shown in FIG. 6, clear effluent from the solid-liquid separator 20 is diverted continuously, or intermittently, via conduit 23 to the screening device 14 where it is mixed with activated sludge prior to its passage through the screening device 14.

Figure 7:
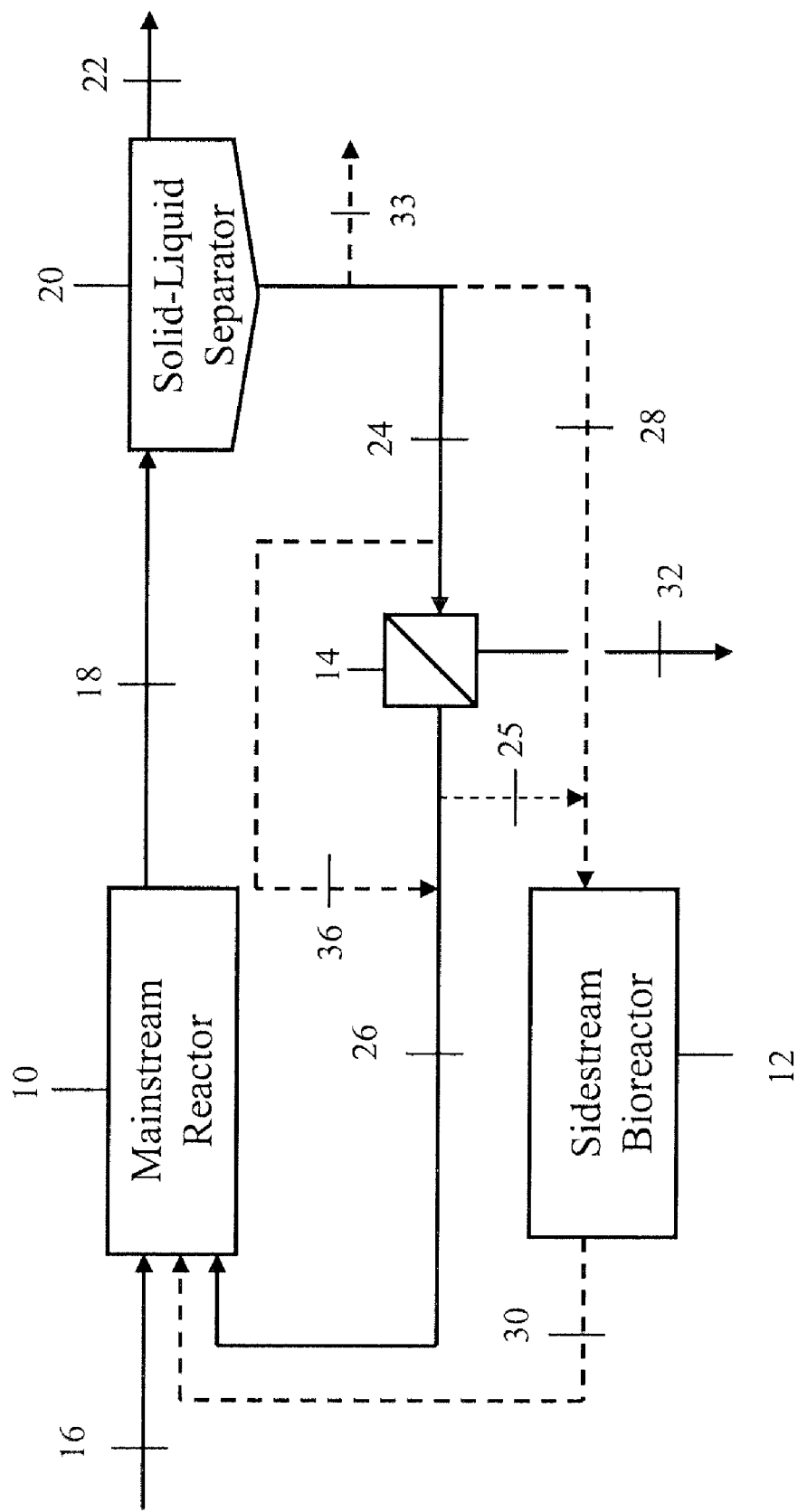
FIG. 7 is a schematic view of a fourth embodiment of an improved wastewater treatment system.

FIG. 7 represents an additional variation on the embodiment illustrated in FIG. 2 where at least a portion of the RAS may be diverted around the screening device 14 by conduit 36.

Figure 8:
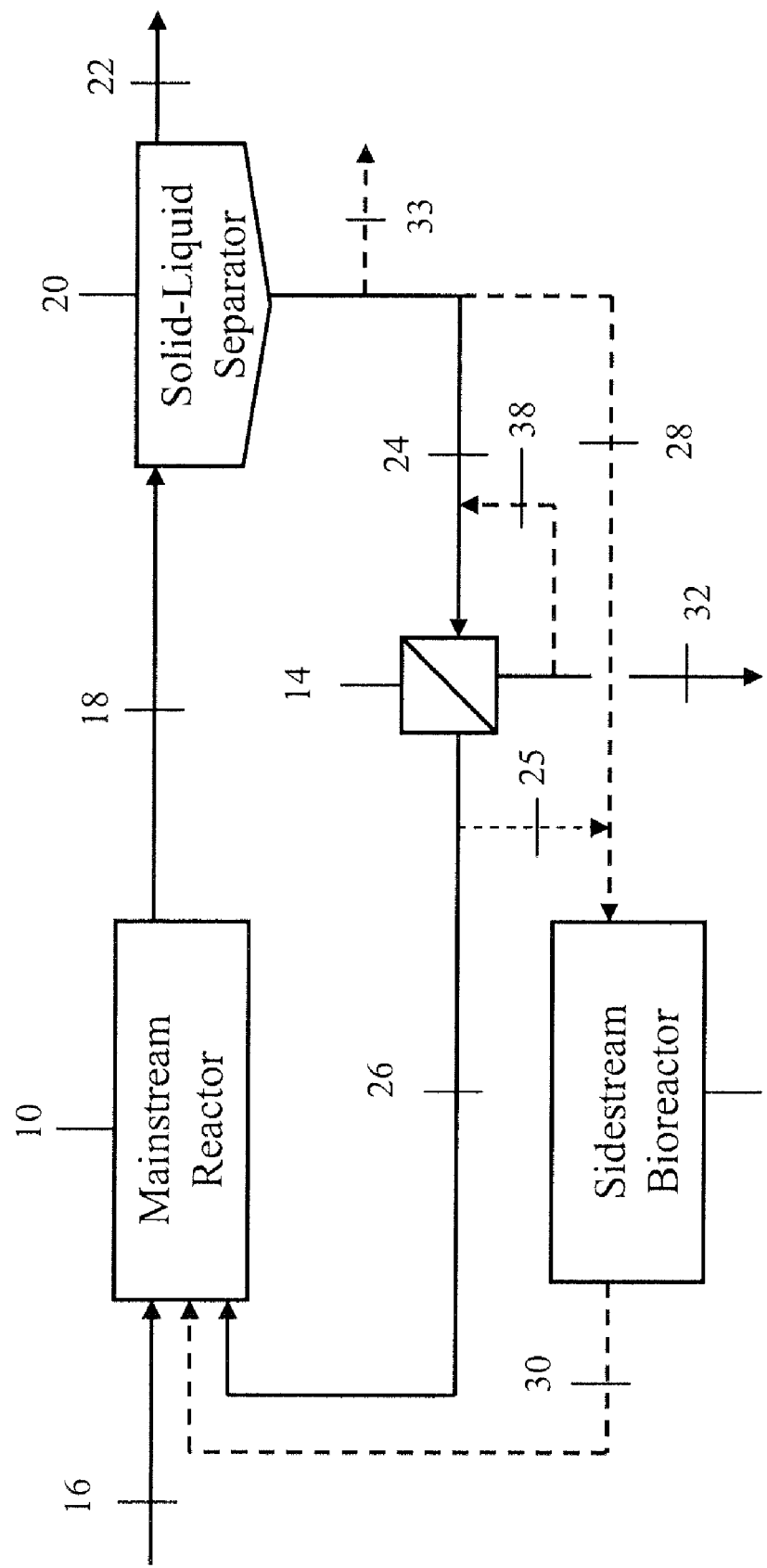
FIG. 8 is a schematic view of a fifth embodiment of an improved wastewater treatment system.

FIG. 8 represents a variation on the embodiment illustrated in FIG. 2 that is designed to enhance performance of the screening device 14. Screened inert solids are recycled by conduit 38 upstream of the screening device 14 to increase the concentration of larger inert solids passing through the screening device 14. This arrangement can result in an increase in screen capture efficiency, analogous to the use of a precoat material, resulting in the capture of inert solids that are particularly fine.

Figure 9:
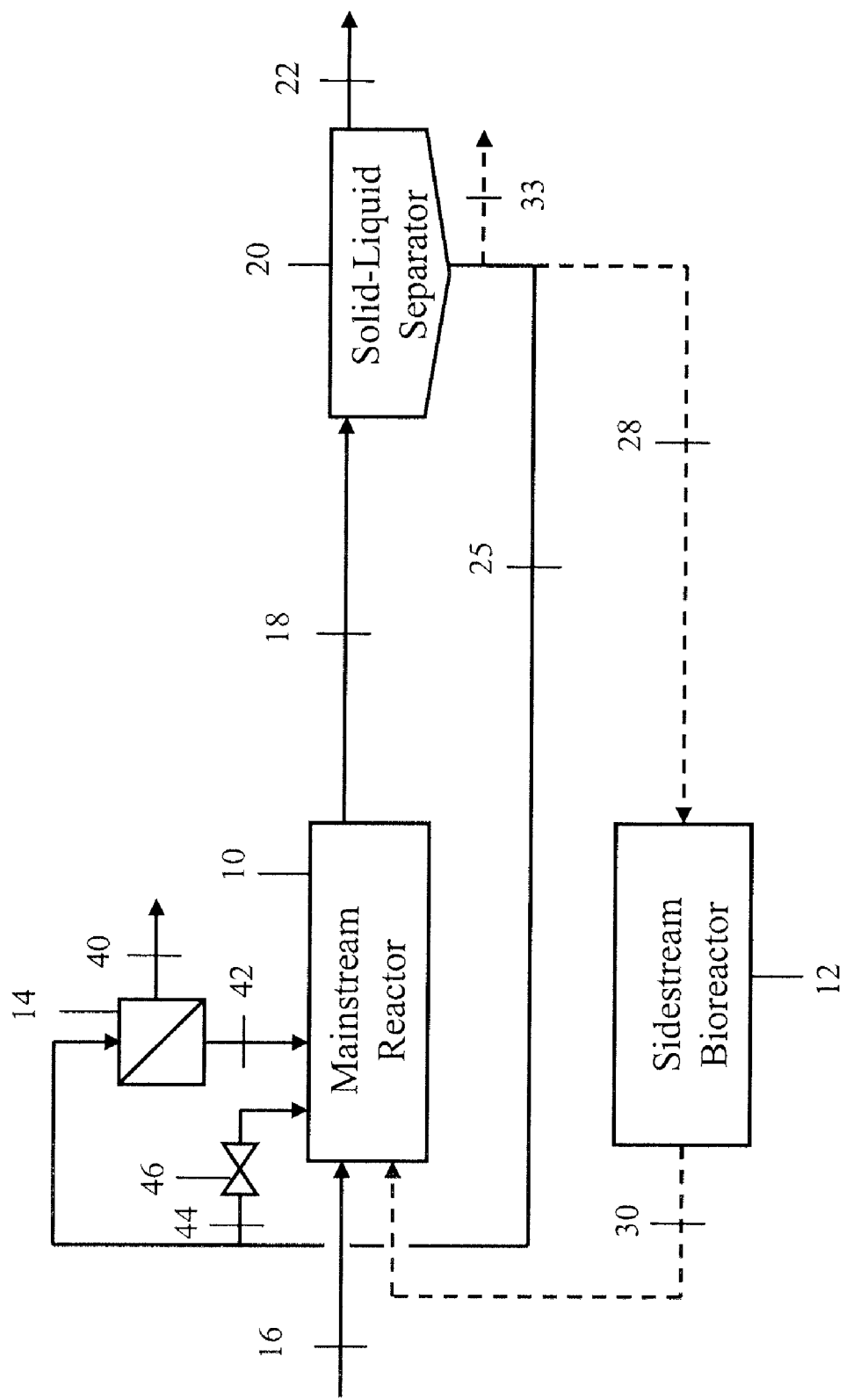
FIG. 9 is a schematic view of a sixth embodiment of an improved wastewater treatment system.

FIG. 9 represents a further variation on the embodiment illustrated in FIG. 2. At least a portion of the RAS from the solid-liquid separator 20 may be routed through conduit 25 to the screening device 14. Screened inert solids are removed from the screening device 14 along conduit 40. Screened RAS is returned to the mainstream reactor by conduit 42. Alternatively or simultaneously, at least a portion of the RAS may be diverted along screen bypass line 44 by opening a valve 46. The screen bypass line 44 allows recycled sludge to discharge directly back into the mainstream reactor 10 without passing through the screening device 14. In one embodiment, the screening device 14 is mounted higher than the mainstream reactor 10 and the screen bypass line 44 is mounted lower than the screening device 14.

Figure 10:
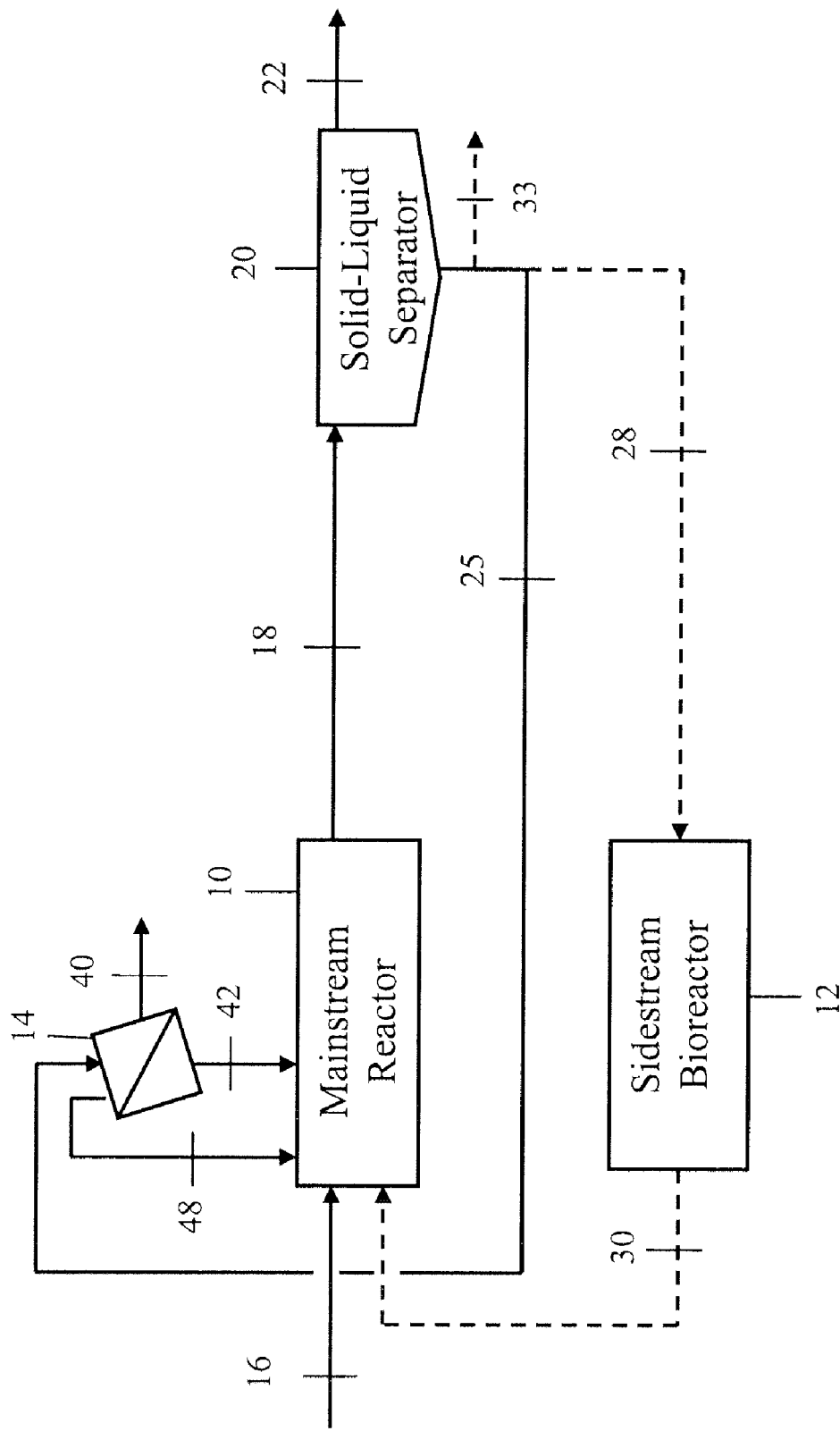
FIG. 10 is a schematic view of a seventh embodiment of an improved wastewater treatment system.
Figure 11:
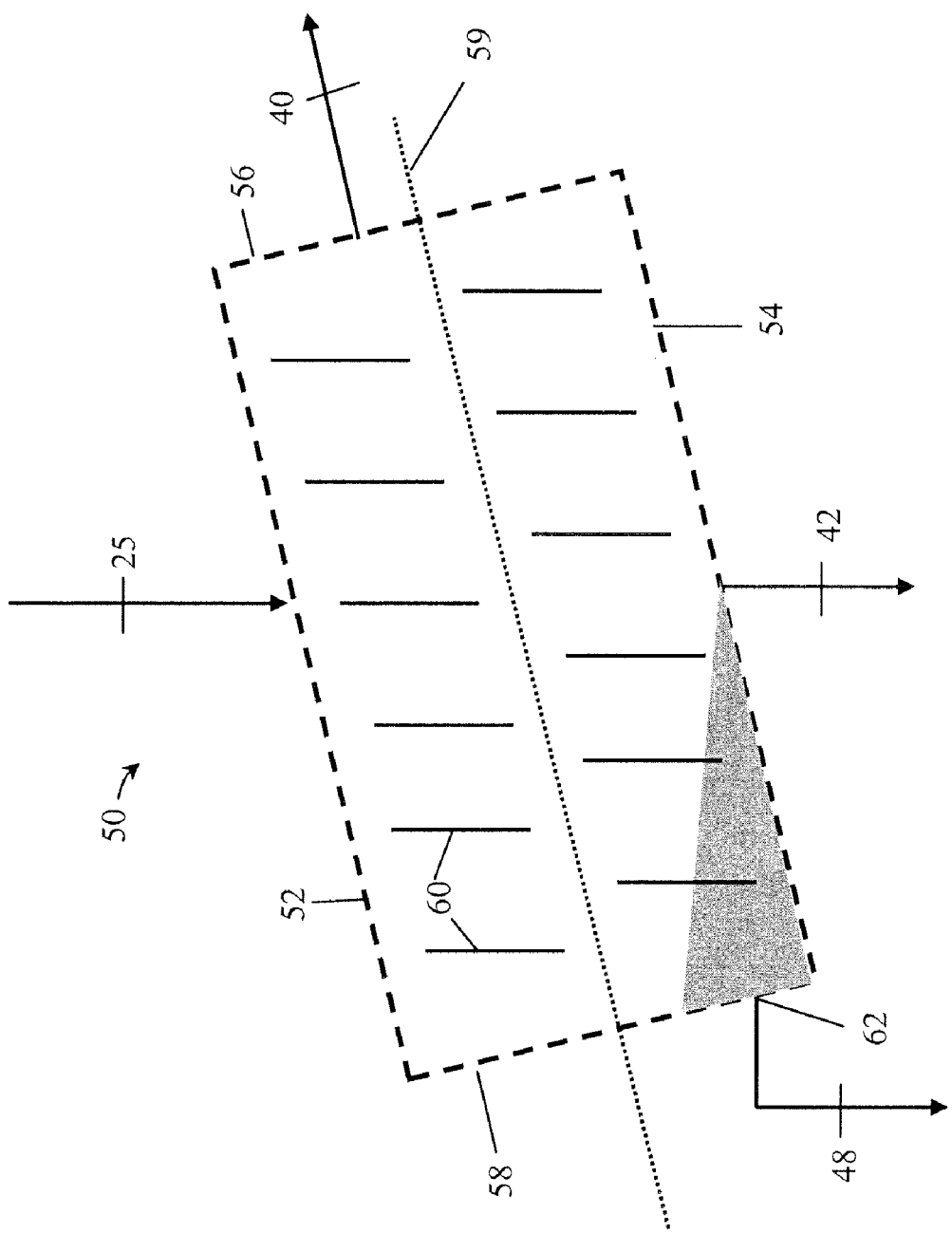
FIG. 11 is a schematic view of the rotary drum screen shown in FIG. 10

FIG. 10 represents yet a further variation on the embodiment illustrated in FIG. 2. The screening device 14 comprises a rotary drum screen 50, as shown in FIG. 11. The rotary drum screen 50 has a top surface 52, a bottom surface 54, a discharge end 56, a feed end 58 and a central axis 59. In the embodiment shown, the top surface 52 and bottom surface 54 are sloped downward from the discharge end 56 to the feed end 58. In another embodiment, the top surface 52 and bottom surface 54 may be horizontal. RAS enters the rotary drum screen 50 along conduit 25. Angled vanes 60 gradually transport screened inert solids uphill toward the discharge end 56 of the rotary drum screen 50. The inert solids are removed from the rotary drum screen 50 by conduit 40. Screened RAS is recycled to the mainstream reactor by conduit 42. Located at the feed end 58 is a dam 62 of a sufficient height so that when the rotary drum screen 50 becomes blinded, any slurry which the rotary drum screen 50 cannot handle automatically spills backwards over the dam 62 and is recycled by conduit 48 to an appropriate location, such as the mainstream reactor 10. Although the rotary drum screen in FIG. 11 is cylindrical, one skilled in the art will recognize that rotary drums can have other shapes, including conical. In one embodiment, the screening device 14 is mounted higher than the mainstream reactor 10.

Figure 12:
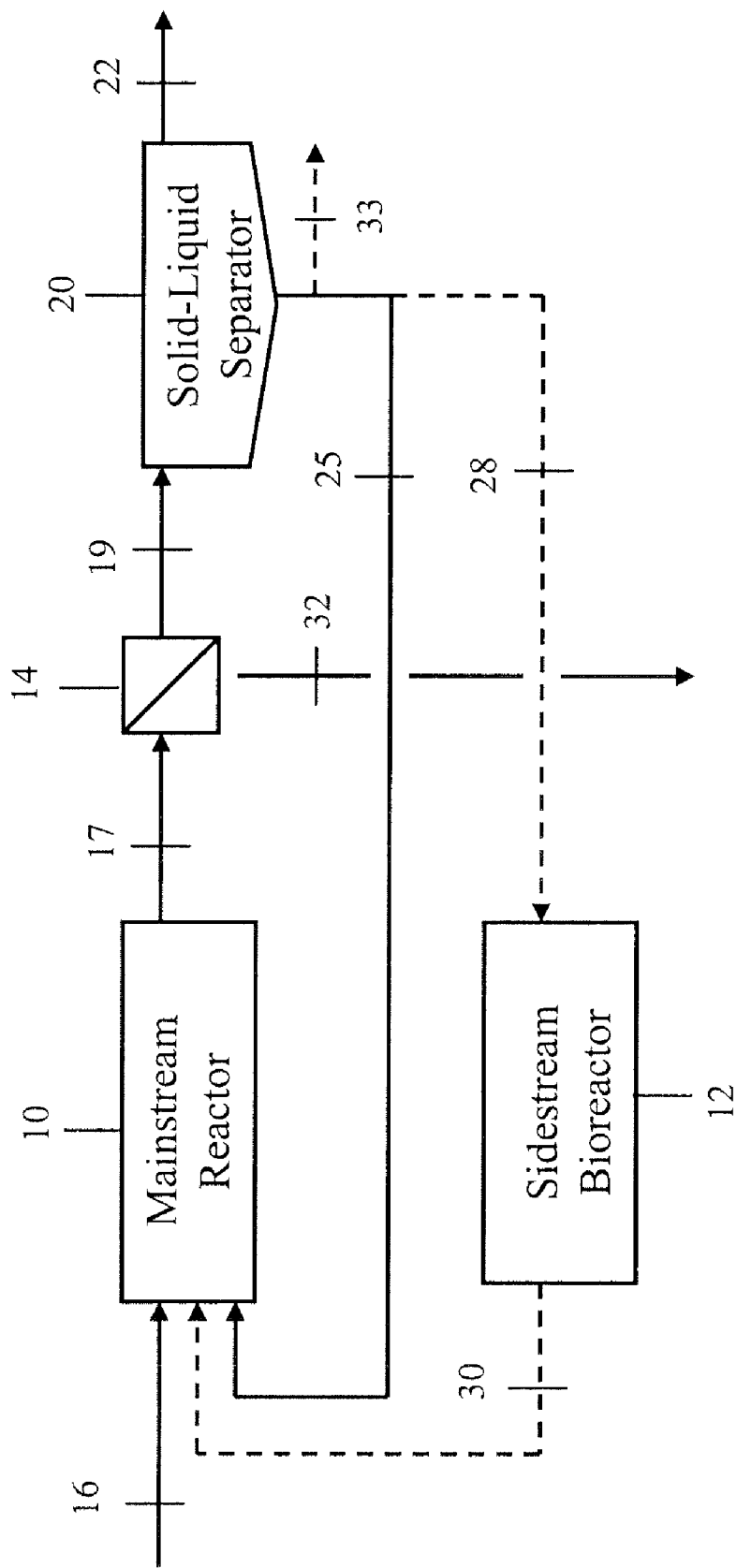
FIG. 12 is a schematic view of an eighth embodiment of an improved wastewater treatment system.

FIG. 12 illustrates an embodiment where the screening device 14 is located upstream of the solid-liquid separator 20. Mixed liquor from the mainstream reactor 10 is transferred by conduit 17 to the screening device 14. Inert solids are removed from the screening device 14 by conduit 32. The screened mixed liquor is then transferred by conduit 19 to the solid-liquid separator 20.

Figure 13:
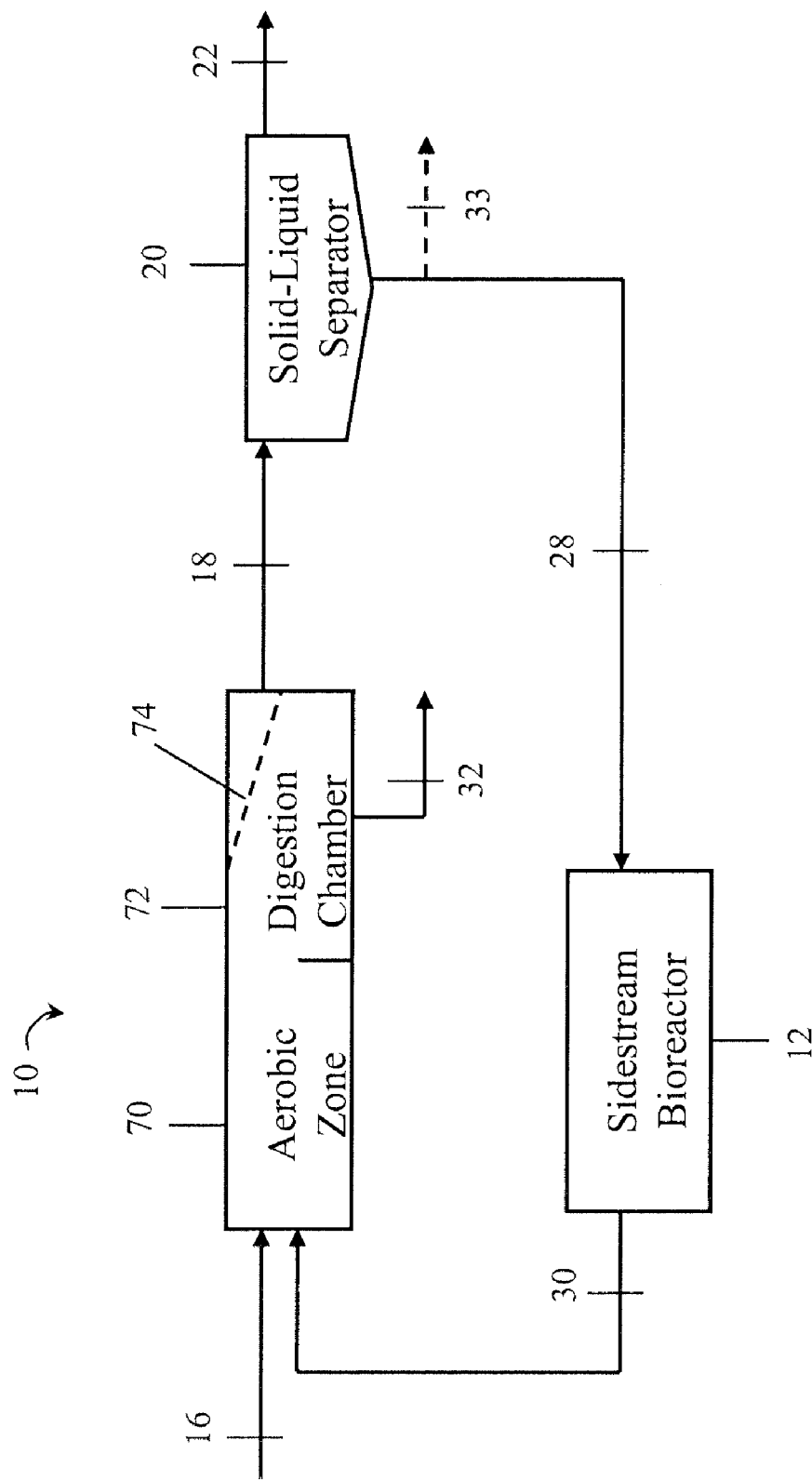
FIG. 13 is a schematic view of a ninth embodiment of an improved wastewater treatment system.

FIG. 13 illustrates an embodiment where the screening device 74 is an "in-situ" screen employed within the mainstream reactor 10. Wastewater enters the mainstream reactor 10 by conduit 16. In this particular embodiment, the mainstream reactor 10 comprises an aeration zone 70 and a digestion chamber 72. The screening device 74 is submerged in the mixed liquor of the digestion chamber 72. A separate conveying step, either continuous or intermittent, is used to remove the inert solids collected by the screening device 74. Screened inert solids are removed from the mainstream reactor 10 by conduit 32. The screened mixed liquor is transported to the solid-liquid separator 20 by conduit 18.

Figure 14:
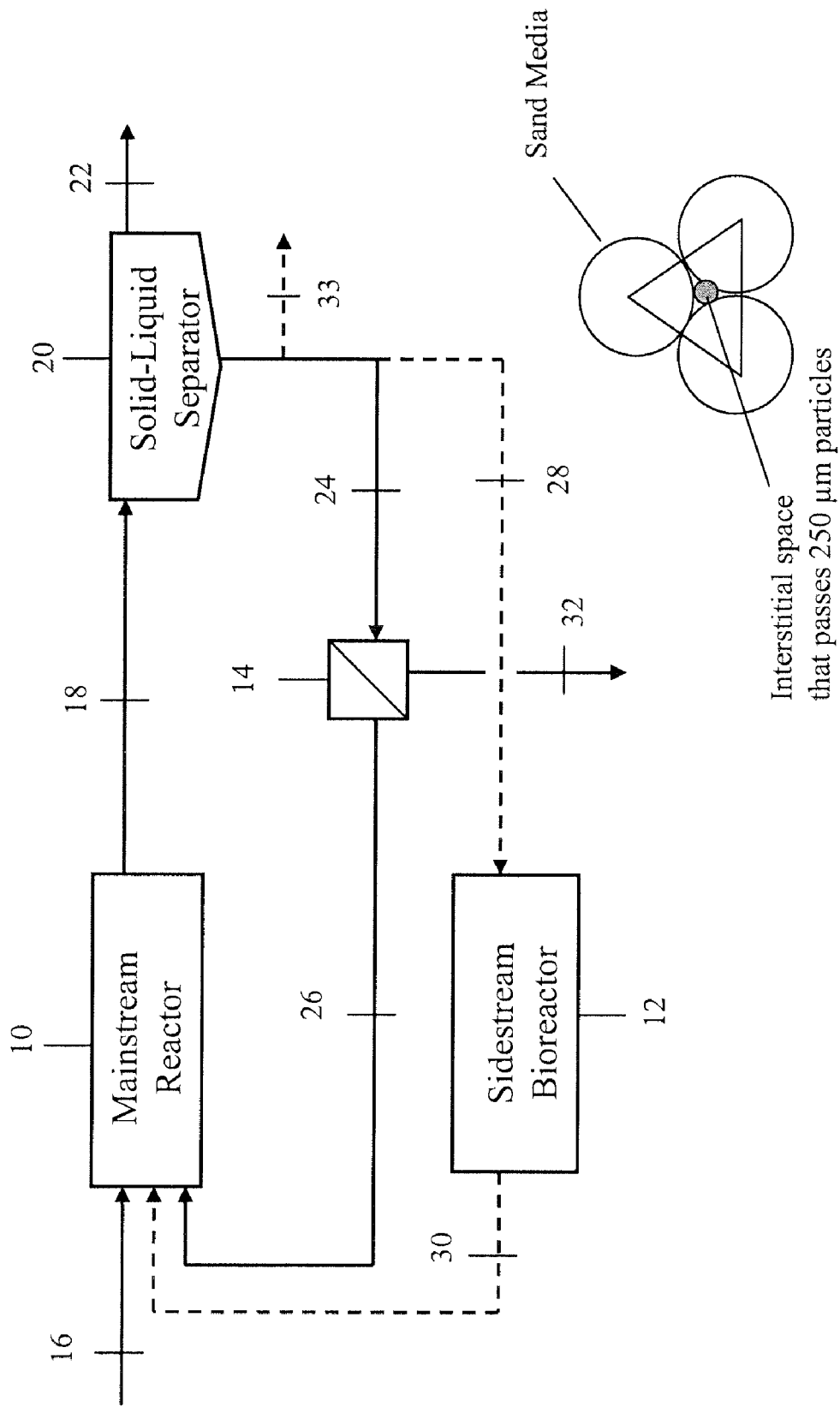
FIG. 14 is a schematic view of a tenth embodiment of an improved wastewater treatment system.

FIG. 14 is a further embodiment of FIG. 2 where the screening device 14 is a media-based filter. The media-based filter may include, but is not limited to, a continuous sand filter and a fine screen with a precoat. In the case of a continuous sand filter, the sand media size would be selected so that the critical dimension is the available passage diameter between adjacent particles in contact. For example, FIG. 14 illustrates how sand media of appropriate size can create an interstitial space that passes 250 µm particles.

It should be recognized by those skilled in the art that the screening device 14 may be located at positions in the treatment process not exemplified in the above embodiments. For example, in one embodiment, the screening device 14 may treat incoming wastewater at a location upstream of the mainstream reactor 10. In other embodiments, multiple screening devices may be located at more than one site within the wastewater treatment process.

The flow rate through the screening device 14 may vary but is typically about 5% to about 400% of the influent flow rate. For example, in a conventional treatment plant having a clarifier as a solid-liquid separator, the RAS rate may be about 25% to about 150% of the influent flow rate to the treatment plant, and the screen flow rate may be about 25% to about 100% of the RAS rate. In a treatment plant having a membrane as a solid-liquid separator, the screening rate may be greater than 100% of the influent flow rate to the plant. The flow rate may be substantially continuous; however, periodic interruptions in flow rate may be tolerated without a significant impact on performance. For example, the flow rate may be temporarily suspended to clean inert solids from the screening device 14. Methods of removing inert solids from the screening device 14 are well-known to those skilled in the art and typically vary with the type of screening device 14 employed.

In a representative implementation, a Contra Shear™ Model #20/40U wedgewire drum screen having a compactor at the discharge end was installed in the RAS pathway of a low-yield wastewater treatment process. The nominal wedgewire opening width was 250 µm, although actual measurements with a dial caliper gave values ranging from 200 µm to 400 µm. RAS upstream of the drum screen was found to have 14,700 mg/l total suspended solids (TSS) and 10,375 mg/l volatile suspended solids (VSS). RAS immediately downstream of the drum screen was found to have 13,100 mg/l TSS and 9,228 mg/l VSS. Screenings sent to the compactor were found to have 11% total solids (TS) and 86% volatile solids (VS). Screenings exiting the compactor were found to have 26% TS of which 88% was VS. When a sample of the screenings sent to the compactor where dropped into a graduated cylinder containing water, most of the sample sank to the bottom of the cylinder, suggesting most solids in the screenings were denser than water. However, it was observed that a significant amount of the screenings appeared to have a specific gravity near that of water.

Thus, the invention provides, among other things, a low-yield wastewater treatment process comprising a sidestream bioreactor and a screening device for removing inert solids. Various features and advantages of the invention are set forth in the following claims.

What is claimed is:

1. A wastewater treatment method comprising:
   combining wastewater comprising readily degradable solids and inert solids with bacteria-laden sludge in a mainstream reactor to form a mixed liquor;
   separating the mixed liquor into a clarified effluent and an activated sludge;
   passing a first portion of activated sludge through a screening device to remove at least a portion of the inert solids and returning the screened first portion of activated sludge to the mainstream reactor; and
   treating a second portion of activated sludge in a sidestream bioreactor prior to returning the second portion of activated sludge to the mainstream reactor.

2. The method of claim 1, wherein the screening device comprises a single screen.

3. The method of claim 1, wherein the screening device comprises more than one screen arranged in one of series, parallel or combination thereof.

4. The method of claim 1, wherein the screening device comprises a drum screen.

5. The method of claim 4, wherein the drum screen comprises wedgewire screening elements.

6. The method of claim 1, wherein the screening device removes inert solids having average particle diameters greater than about 100 µm.

7. The method of claim 1, wherein the screening device removes inert solids having average particle diameters greater than about 50 µm.

8. The method of claim 1, wherein the screening device comprises at least one screen having openings ranging in size from about 10 µm to about 6,000 µm.

9. The method of claim 1, wherein the screening device comprises at least one screen having openings ranging in size from about 10 µm to about 2,500 µm.

10. The method of claim 1, wherein the screening device comprises at least one screen having openings ranging in size from about 250 µm to about 500 µm.

11. The method of claim 1, wherein the sidestream bioreactor is a sequencing facultative digester.

12. The method of claim 1, wherein about 90% of the activated sludge in the solid-liquid separator is passed to the screening device and about 10% of the activated sludge is transferred to the sidestream bioreactor.

13. The method of claim 1 further comprising diluting the first portion of activated sludge upstream of the screening device with mixed liquor from the mainstream reactor.

14. The method of claim 1 further comprising diverting at least a fraction of the first portion of activated sludge around the screening device and returning the fraction to the mainstream reactor.

15. The method of claim 1 further comprising adding at least a portion of the clarified effluent to the activated sludge prior to passage of the activated sludge through the screening device.

16. The method of claim 1 further comprising concentrating the first portion of activated sludge upstream of the screening device with a portion of the inert solids removed by the screening device.

17. The method of claim 1, wherein the screening device is a media-based filter.

18. The method of claim 1, wherein a membrane filter is used to separate the mixed liquor into the clarified effluent and the activated sludge.

19. The method of claim 1 further comprising wasting at least a portion of the activated sludge.

20. A wastewater treatment method comprising:
combining wastewater comprising readily degradable solids and inert solids with bacteria-laden sludge in a mainstream reactor to form a mixed liquor;
separating the mixed liquor into a clarified effluent and an activated sludge;
returning a first portion of activated sludge to the mainstream reactor through one of a screening device that removes at least a portion of the inert solids from the activated sludge, a screen bypass line that discharges activated sludge directly into the mainstream reactor, or a combination of both; and
treating a second portion of activated sludge in a sidestream bioreactor prior to returning the second portion of activated sludge to the mainstream reactor.

21. The method of claim 20, wherein the screening device is mounted higher than the mainstream reactor and the screen bypass line is mounted lower than the screening device.

22. The method of claim 21, further comprising a valve on the screen bypass line to control the amount of the first portion of activated sludge that passes through the screening device.

23. The method of claim 20, wherein the screening device comprises a single screen.

24. The method of claim 20, wherein the screening device comprises more than one screen arranged in one of series, parallel or combination thereof.

25. The method of claim 20, wherein the screening device comprises a drum screen.

26. The method of claim 25, wherein the drum screen comprises wedgewire screening elements.

27. The method of claim 20, wherein the screening device removes inert solids having average particle diameters greater than about 100 μm.

28. The method of claim 20, wherein the screening device removes inert solids having average particle diameters greater than about 50 μm.

29. The method of claim 20, wherein the screening device comprises at least one screen having openings ranging in size from about 10 μm to about 6,000 μm.

30. The method of claim 20, wherein the screening device comprises at least one screen having openings ranging in size from about 10 μm to about 2,500 μm.

31. The method of claim 20, wherein the screening device comprises at least one screen having openings ranging in size from about 250 μm to about 500 μm.

32. The method of claim 20, wherein the sidestream bioreactor is a sequencing facultative digester.

33. The method of claim 20, wherein about 90% of the activated sludge is returned to the mainstream reactor as the first portion of activated sludge and about 10% of the activated sludge is returned to the mainstream reactor as the second portion of activated sludge.

34. The method of claim 20, wherein the screening device is a media-based filter.

35. The method of claim 20, wherein a membrane filter is used to separate the mixed liquor into the clarified effluent and the activated sludge.

36. The method of claim 20 further comprising wasting at least of portion of the activated sludge.

37. A wastewater treatment method comprising:
combining wastewater comprising readily degradable solids and inert solids with bacteria-laden sludge in a mainstream reactor to form a mixed liquor;
separating the mixed liquor into a clarified effluent and an activated sludge;
passing a first portion of activated sludge through a rotary drum to remove at least a portion of the inert solids and returning the screened first portion of activated sludge to the mainstream reactor; and
treating a second portion of activated sludge in a sidestream bioreactor prior to returning the second portion of activated sludge to the mainstream reactor.

38. The method of claim 37, wherein the rotary drum screen comprises a dam of sufficient height such that when the rotary drum screen becomes blinded, any first portion of activated sludge which the rotary drum screen cannot handle automatically spills over the dam and is recycled to the mainstream reactor.

39. The method of claim 37, wherein the screening device removes inert solids having average particle diameters greater than about 100 μm.

40. The method of claim 37, wherein the screening device removes inert solids having average particle diameters greater than about 50 μm.

41. The method of claim 37, wherein the screening device comprises at least one screen having openings ranging in size from about 10 μm to about 2,500 μm.

42. The method of claim 37, wherein the screening device comprises at least one screen having openings ranging in size from about 250 μm to about 500 μm.

43. The method of claim 37, wherein the sidestream bioreactor is a sequencing facultative digester.

44. The method of claim 37, wherein a membrane filter is used to separate the mixed liquor into the clarified effluent and the activated sludge.

45. The method of claim 37, wherein the rotary drum screen is mounted higher than the mainstream reactor.

46. The method of claim 37 further comprising wasting at least a portion of the activated sludge.

47. A wastewater treatment method comprising:
combining wastewater comprising readily degradable solids and inert solids with bacteria laden sludge in a mainstream reactor to form a mixed liquor;
passing at least a portion of the mixed liquor through a screening device to remove at least a portion of the inert solids;
separating the screened mixed liquor into a clarified effluent and an activated sludge;
recycling a first portion of activated sludge to the mainstream reactor; and
treating a second portion of activated sludge in a sidestream bioreactor prior to returning the second portion of activated sludge to the mainstream reactor.

48. The method of claim 47, wherein the screening device is situated inside the mainstream reactor.

49. The method of claim 47, wherein the screening device is separate from and downstream of the mainstream reactor.

50. The method of claim 47, wherein the screening device comprises a single screen.

51. The method of claim 47, wherein the screening device comprises more than one screen arranged in one of series, parallel or combination thereof.

52. The method of claim 47, wherein the screening device comprises a drum screen.

53. The method of claim 52, wherein the drum screen comprises wedgewire screening elements.

54. The method of claim 47, wherein the screening device removes inert solids having average particle diameters greater than about 100 µm.

55. The method of claim 47, wherein the screening device removes inert solids having average particle diameters greater than about 50 µm.

56. The method of claim 47, wherein the screening device comprises at least one screen having openings ranging in size from about 50 µm to about 6,000 µm.

57. The method of claim 47, wherein the screening device comprises at least one screen having openings ranging in size from about 50 µm to about 2,500 µm.

58. The method of claim 47, wherein the screening device comprises at least one screen having openings ranging in size from about 250µm to about 500µm.

59. The method of claim 47, wherein the sidestream bioreactor is a sequencing facultative digester.

60. The method of claim 47, wherein about 90% of the activated sludge is returned to the mainstream reactor as the first portion of activated sludge and about 10% of the activated sludge is returned to the mainstream reactor as the second portion of activated sludge.

61. The method of claim 47, wherein the screening device is a media-based filter.

62. The method of claim 47, wherein a membrane filter is used to separate the screened mixed liquor into the clarified effluent and the activated sludge.

63. The method of claim 47 further comprising wasting at least a portion of the activated sludge.

* * * * *